US011839328B2

(12) United States Patent
Walsh

(10) Patent No.: US 11,839,328 B2
(45) Date of Patent: Dec. 12, 2023

(54) BEVERAGE CONTAINER HEATING APPARATUSES AND ASSOCIATED METHODS

(71) Applicant: Illuminent, Inc., Highlands Ranch, CO (US)

(72) Inventor: Jeffrey M. Walsh, Highlands Ranch, CO (US)

(73) Assignee: ILLUMINENT, INC., Greenwich, CT (US)

( * ) Notice: Subject to any disclaimer, the term of this patent is extended or adjusted under 35 U.S.C. 154(b) by 353 days.

(21) Appl. No.: 16/954,001

(22) PCT Filed: Dec. 3, 2018

(86) PCT No.: PCT/US2018/063687
§ 371 (c)(1),
(2) Date: Jun. 15, 2020

(87) PCT Pub. No.: WO2019/112973
PCT Pub. Date: Jun. 13, 2019

(65) Prior Publication Data
US 2020/0390276 A1   Dec. 17, 2020

Related U.S. Application Data

(63) Continuation of application No. 15/831,011, filed on Dec. 4, 2017, now abandoned.

(51) Int. Cl.
*A47J 36/26*     (2006.01)
*A47J 36/24*     (2006.01)
(Continued)

(52) U.S. Cl.
CPC ...... *A47J 36/2483* (2013.01); *A47G 23/0216* (2013.01); *B65D 81/3876* (2013.01);
(Continued)

(58) Field of Classification Search
CPC ............. A47J 36/2483; A47J 36/2433; A47J 36/2461; A47J 36/2472; A47G 23/0216;
(Continued)

(56) References Cited

U.S. PATENT DOCUMENTS 2,589,645 A    3/1952   Tiegel et al.
3,968,346 A    7/1976   Stanfield
(Continued)

FOREIGN PATENT DOCUMENTS

CN           2594186 Y       12/2003
CN         201356889 Y       12/2009
(Continued)

OTHER PUBLICATIONS

International Search Report and Written Opinion dated Apr. 22, 2019 in International Application No. PCT/US18/63687 for Walsh et al., filed Dec. 3, 2018, 17 pages.
(Continued)

*Primary Examiner* — John K Fristoe, Jr.
*Assistant Examiner* — Elizabeth J Volz
(74) *Attorney, Agent, or Firm* — Perkins Coie LLP

(57) ABSTRACT

Beverage container heating apparatuses and associated methods for using such apparatuses are disclosed. In one embodiment, for example, a flexible band or sleeve is configured to wrap around an exterior surface of a beverage container. The flexible band can include a first layer configured to be positioned in contact with the exterior surface of the beverage container. The first layer comprises a reflective surface facing the beverage container and a heating element configured to provide heat to the exterior surface of the beverage container. The flexible band may also include a second layer adjacent to and covering at least a portion of the first layer. The second layer can include a removable insulation assembly. The flexible band further includes a
(Continued)

third layer adjacent to and covering at least a portion of the second layer. The third layer can include various electronic components, such as a control circuitry and a battery.

20 Claims, 9 Drawing Sheets

(51) Int. Cl.
*B65D 81/38* (2006.01)
*A47G 23/02* (2006.01)

(52) U.S. Cl.
CPC ............... *A47G 2023/0291* (2013.01); *A47G 2200/166* (2013.01); *A47J 36/2433* (2013.01)

(58) Field of Classification Search
CPC ...... A47G 2023/0291; A47G 2200/166; A47G 19/2288
USPC .......................... 219/386; 220/737; 99/323.3
See application file for complete search history.

(56) References Cited

U.S. PATENT DOCUMENTS

| | | | |
|---|---|---|---|
| 4,593,752 A * | 6/1986 | Tipton | ............... A47J 36/2483 62/503 |
| 5,436,429 A | 7/1995 | Cline | |
| 6,870,135 B2 | 3/2005 | Hamm | |
| 6,913,159 B1 | 7/2005 | Goldberg | |
| D637,311 S | 5/2011 | Isobe et al. | |
| 8,056,757 B2 | 11/2011 | Mansour | |
| 9,265,371 B2 | 2/2016 | Soule et al. | |
| 9,420,908 B1 | 8/2016 | White | |
| 9,468,341 B1 | 10/2016 | Goode | |
| 9,801,482 B1 | 10/2017 | Alexander et al. | |
| 9,995,529 B1 | 6/2018 | Banks | |
| 2004/0139860 A1 | 7/2004 | Hamm et al. | |
| 2009/0255647 A1 | 10/2009 | Lim | |
| 2010/0025414 A1 | 2/2010 | Mansour | |
| 2012/0319414 A1 | 12/2012 | Potter et al. | |
| 2013/0206783 A1 | 8/2013 | Hecht | |
| 2014/0190357 A1 | 7/2014 | Mak et al. | |
| 2015/0313301 A1 | 11/2015 | Shineman et al. | |
| 2016/0242598 A1 | 8/2016 | Alexander et al. | |
| 2016/0302600 A1 | 10/2016 | Barrett | |
| 2017/0208991 A1 | 7/2017 | Dwyer et al. | |
| 2017/0238764 A1 | 8/2017 | Cardinal-Marchand | |
| 2017/0360183 A1 | 12/2017 | Macdonald | |
| 2018/0078065 A1 | 3/2018 | Cheatham et al. | |
| 2019/0002185 A1 | 1/2019 | Carroll | |
| 2019/0167034 A1 | 6/2019 | Walsh | |
| 2019/0168946 A1 | 6/2019 | Walsh | |

FOREIGN PATENT DOCUMENTS

| | | | | |
|---|---|---|---|---|
| CN | 201564142 U | | 9/2010 | |
| CN | 107242743 A | | 10/2017 | |
| DE | 10327464 A1 | | 1/2005 | |
| DE | 102009053397 A1 | | 5/2011 | |
| DE | 202012100510 U1 | | 3/2012 | |
| DE | 102015122045 | * | 6/2017 | ............. A47G 23/02 |
| DE | 102015122045 A1 | * | 6/2017 | ............. A47G 23/02 |
| DE | 102015122045 A1 | | 6/2017 | |
| GB | 894615 A | | 4/1962 | |
| WO | 2007012868 A1 | | 2/2007 | |
| WO | 2014107840 A1 | | 7/2014 | |

OTHER PUBLICATIONS

Non-Final Office Action dated Dec. 30, 2019 in U.S. Appl. No. 15/831,034 for Walsh et al., filed Dec. 4, 2017, 14 pages.
Non-Final Office Action dated Dec. 31, 2019 in U.S. Appl. No. 15/831,011 for Walsh et al., filed Dec. 4, 2017, 10 pages.
Extended Search Report dated Jul. 26, 2021, in European Patent Application No. 18885171.1, 8 pages.
Office Action dated Nov. 3, 2021 in Chinese Patent Application No. 201880088594.2, 8 pages.

* cited by examiner

BEVERAGE CONTAINER HEATING APPARATUSES AND ASSOCIATED METHODS

CROSS-REFERENCE TO RELATED APPLICATION

The present application is a National Stage entry of International Patent Application No. PCT/US18/63687, filed on Dec. 3, 2018, which claims priority to U.S. patent application Ser. No. 15/831,011 filed Dec. 4, 2017, which is incorporated herein by reference in its entirety.

TECHNICAL FIELD

The present technology is directed generally toward beverage container heating apparatuses and associated methods for using such apparatuses.

BACKGROUND

Drinking a hot beverage is an important part of life for many people. A hot cup of coffee is a regular, and often cherished, part of the morning for many. A warm bottle of baby formula is often a necessity for infants. Drinkware, such as cups, mugs, travel mugs, and baby bottles, is often used to hold hot liquids for the consumer until the liquid is ready to drink. A common issue with many existing drinkware is the inability to keep the beverage at a desired temperature for a long period of time. In some instances, for example, a beverage that is too hot for consumption is prepared and poured into the drinkware. In these situations, the consumer waits until the beverage has sufficiently cooled to a temperature that is safe to drink. However, if the consumer waits too long or prefers to drink the beverage slowly over a long period of time, the liquid may cool down too much, resulting in a beverage that is no longer satisfying (or even potentially dangerous in the case baby formula for infants).

Many types of drinkware are specifically designed to reduce the cooling rate of the hot liquid and to prolong the time over which the beverage cools enough to drink without the risk of burning, while remaining warm enough for a satisfactory drinking experience. These beverage containers are often formed from materials, such as ceramics or plastics, possessing insulative properties that aid in the temperature controlling process. While these materials may increase the time for which a beverage is safe and satisfying to drink, they are still incapable of maintaining the beverage at an elevated temperature for a prolonged period of time. Other types of drinkware, such as French presses made from glass or disposable coffee cups made from paper-based materials, possess few insulative properties and are subject to rapid cooling. It would therefore be desirable to develop a beverage warming apparatus that can be used in conjunction with existing drinkware to maintain the temperature of a liquid at a desired temperature for a prolonged period of time, ensuring that drinking the beverage remains safe and satisfying.

DETAILED DESCRIPTION

The following disclosure describes various aspects of beverage container heating apparatuses and associated methods for using such apparatuses. Certain details are set forth in the following description and in FIGS. 1A-11B to provide a thorough understanding of various embodiments of the technology. Well-known structures, systems and methods often associated with beverage containers and related apparatuses, however, have not been shown or described in detail below to avoid unnecessarily obscuring the description of the various embodiments of the present technology. Any dimensions, angles, and other specifications shown in the Figures are merely illustrative of particular embodiments of the technology. Accordingly, other embodiments of the technology can have other dimensions, angles, and specifications without departing from the spirit or scope of the present disclosure. In addition, those of ordinary skill in the relevant art will understand that additional embodiments of the technology may be practiced without several of the details described below.

Figure 1A:
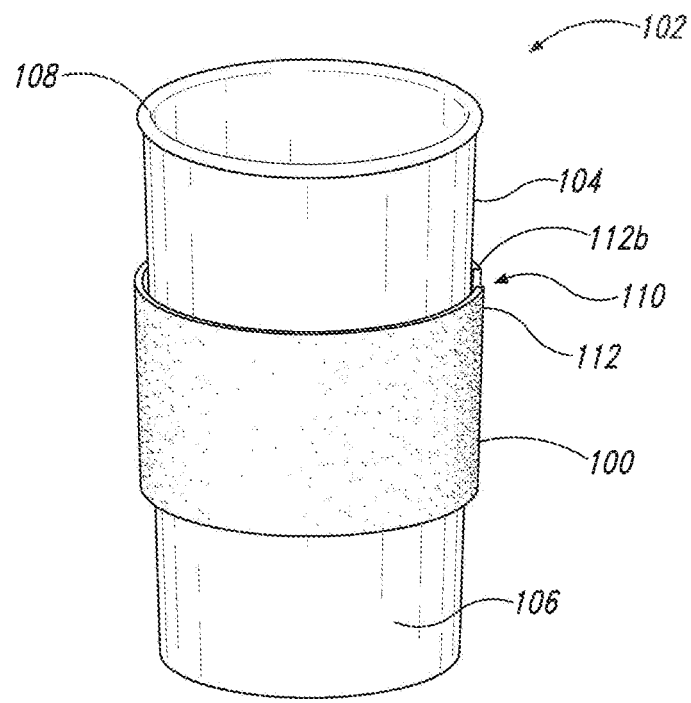
FIG. 1A is a perspective view of a sleeve configured in accordance with the present technology arranged around a beverage container.

A. Selected Implementations of Beverage Container Heating Apparatuses and Associated Methods for Using Such Apparatuses FIG. 1A is a perspective view of a sleeve 100 (also known as "flexible band" and "flexible sleeve") configured in accordance with an embodiment of the present technology arranged around a beverage container 102 (also known as "container"). The beverage container 102 is formed from a container body 104 (also known as "body") and an inner cavity within the container body 104 may be configured to receive and hold a beverage (not shown) for consumption by a user. The body 104 may also include an exterior surface 106 and the sleeve 100 is adapted to be circumferentially arranged around the exterior surface 106 such that an inner surface (not shown) of the sleeve 100 is in immediate contact with the exterior surface 106.

In the example shown in FIG. 1A, the beverage container 102 is a disposable cup having a lip portion 108 on which a lid can be coupled. The use of an open-mouthed cup, however, is merely an example. In other embodiments, the sleeve 100 may be arranged around a variety of other suitable beverage containers, such as a travel mug, a baby bottle, a French press, or other suitable containers. In still other embodiments, the sleeve 100 may be arranged around a beverage container 102 not configured to be coupled to a lid, such as a mug or a cup. In general, the sleeve 100 may be arranged around any desired style/size/shape of beverage containers.

When the sleeve 100 is not arranged about the beverage container 102, the sleeve 100 may be a rectangular structure having a first end portion 112a and a second end portion 112b located at opposing ends of the rectangular structure. The sleeve 100 may be formed from a flexible and partially stretchable material capable of conforming to the exterior surface 106 of beverage containers 102 of many different sizes and styles. When the sleeve 100 is engaged with the exterior surface 106 of the beverage container 102, the sleeve 100 is configured for stretching to ensure that the first end portion 112a and the second end portion 112b at least partially overlap such that the sleeve 100 completely wraps about the exterior surface 106 of the beverage container 102.

For beverage containers 102 having an outer perimeter that is too large for the sleeve to completely surround, however, an optional gap 110 may be formed between the two end portions 112a and 112b. As will be discussed in greater detail in conjunction with FIGS. 5A-5C, the sleeve 100 may include a securing mechanism (not shown) to attach the first end portion 112a to the second end portion 112b when the sleeve 100 is arranged around the beverage container 102. In particular, when the sleeve 100 is wrapped around a large beverage container 102, the securing mechanism is configured to span the gap 110 to ensure that the first and second end portions 112a, 112b remain securely attached to each other and that the inner surface of the sleeve 100 maintains contact with the exterior surface 106. As noted previously, the sleeve 100 is adapted for stretching to fit around beverage containers 102 of many shapes and sizes (and may fit around many containers without forming of the gap 110). In these embodiments, the securing mechanism may not be required to ensure that the sleeve 100 remains securely engaged with the exterior surface 106 of the respective container.

Figure 1B:
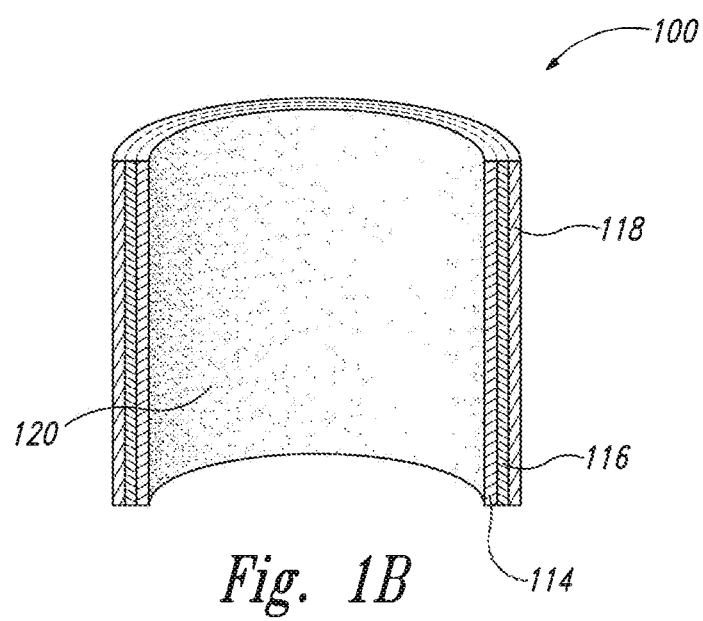
FIG. 1B is a cross-sectional view of the sleeve of FIG. 1A.

FIG. 1B is a cross sectional view of the sleeve 100 of FIG. 1A when the sleeve 100 is positioned around the beverage container 102 (FIG. 1A). Referring to FIG. 1A and FIG. 1B together, the sleeve 100 in the illustrated embodiment includes an inner layer 114 configured to be arranged adjacent to the exterior surface 106 of the beverage container 102. The sleeve 100 also includes a middle layer 116 positioned adjacent to the inner layer 114 and an outer layer 118 positioned adjacent to the middle layer 114 such that the middle layer 116 is interposed between the inner layer 114 and the outer layer 118.

The inner layer 114 may include an inner, reflective surface 120 configured to be positioned adjacent to and facing the exterior surface 106 of the beverage container 102 when the sleeve 100 is wrapped around the container 102. As will be discussed in greater detail below, the reflective surface 120 is positioned to reflect heat coming off of the exterior surface 106 back towards the beverage container 102. The inner layer 114 may also include a heating element (not shown) arranged on the reflective surface 120 that is configured to generate and provide heat to the exterior surface 106 of the beverage container 102.

The middle layer 116 may be formed from an insulating material configured to absorb and store heat given off by the heating element in the inner layer 114 and/or heat given off by the beverage container 102 that does not get reflected back towards the beverage container 102 by the reflective surface 120. In some embodiments, the middle layer 116 may be permanently arranged between the inner layer 114 and the outer layer 118. In these embodiments, the insulating material may be a naturally occurring material (e.g., wool), a manmade material, and/or may be biodegradable. The insulating material may have a thermal resistance (i.e., an R-value) and a thickness that enables the sleeve 100 to maintain the temperature of the liquid held in the cavity of the beverage container 102 for a desired period of time without the use of the heating element included in the inner layer 114. It will be appreciated by those having ordinary skill in the art that the middle layer 116 may be composed of an insulating material having any desirable thermal resistance and thickness to maintain the temperature of a liquid retained within the beverage container 102 at or near a desired temperature for a desired period of time.

In other embodiments, the middle layer 116 may be a removable component that is slidably removable from the sleeve 100. As will be described in further detail below, the inner layer 114 and the outer layer 118 may be releasably coupled to each other along one edge of the sleeve 100 such that an opening is formed between the two layers. The middle layer 116 may be removably insertable into the opening and may be heatable using an external heating system when removed from the opening. In these embodiments, the insulating material may be a food safe material, may be a natural/vegetable-based material, may be sealed in a plastic wrapping, and/or may be waterproof. Further, in such embodiments the middle layer 116 may be composed of a material capable of being reheated a number of times using an external heating system.

Referring back to FIG. 1A, before beverage container 102 receives a liquid (not shown), the body 104 is typically at a lower temperature than the hot liquid. After the liquid is received within the body 104, the liquid exchanges heat with the body 104 to establish a thermal equilibrium between the body 104 and the liquid. As more heat is transferred into the body 104, the body 104 begins to heat up. The rate at which the temperature of the liquid and the temperature of the body 104 change is dependent on, among other things, the properties of the liquid (e.g., temperature, heat capacity, etc.), material properties of the body 104 (e.g., temperature, heat capacity, thermal conductivity, thermal resistance, thickness, etc.), and properties of the medium surrounding the exterior surface 106 of the beverage container 102 (e.g., air temperature). In situations where the exterior surface 106 of the beverage container 102 is completely exposed to the open air, the heat transferred from the hot liquid to the body 104 will be transferred to the air until the temperature of the hot liquid and the temperature of the body 104 are equal to the temperature of the air (if the beverage container 102 is left undisturbed). However, in situations where the sleeve 100 is arranged around the exterior 106 of the beverage container 102, the transference of heat from the hot liquid to the body 104 and from the body 104 to the air may be significantly slowed or stopped.

Figure 2A:
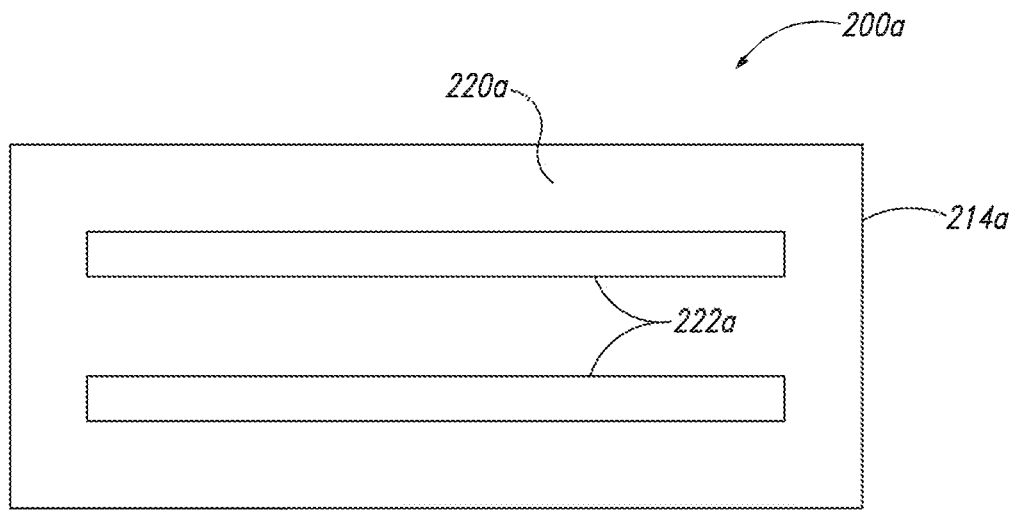
FIG. 2A is a schematic top view of a first embodiment of an inner layer of a sleeve configured in accordance with an embodiment of the present technology.

FIG. 2A is a schematic top view of a first embodiment of an inner layer 214a of sleeve 200a. The sleeve 200a, for example, may include a number of features similar to or identical to the features of sleeve 100 and inner layer 114 of FIGS. 1A and 1B. Further, the sleeve 100 may include some or all of the features of the sleeves 200a and 200b described herein. The inner layer 214a in the embodiment shown in FIG. 2A, for example, may include a reflective surface 220a and a heating element 222a. When the sleeve 200a is arranged around a suitable beverage container (not shown), the inner layer 214a is configured to be positioned in contact with an exterior surface of the container such that the reflective surface 220a faces the exterior surface. The reflective surface 220a, for example, may completely cover the entire inward-facing surface of the inner layer 214a. In other embodiments, however, the reflective surface 220a may only cover a portion of the surface of the inner layer 214a.

When the sleeve 200a is positioned on a container (e.g., container 102 of FIG. 1A), the reflective surface 220a is configured to reflect at least some of the radiated heat from hot liquid within the container back toward an exterior surface of the container. By reflecting the heat, changes in temperature of the body of the container due to radiation of heat are expected to be reduced, thereby causing the temperature of the container body to remain at an elevated temperature for a longer period of time. As a result, changes in temperature between the hot liquid and the container body are also expected to be reduced. This is expected to result in the hot liquid remaining at an elevated temperature for a longer period of time, thus increasing the satisfaction of a consumer of the hot beverage.

While the reflective surface 220a may prolong the time period at which the hot liquid remains at an elevated temperature, the temperature of the liquid may still eventually decrease to a temperature that is no longer satisfying for a consumer to drink. To help further prevent this temperature decrease from occurring, the inner layer 214a may also include a heating element 222a. The heating element 222a, for example, may be a strip (or strips) of heat tape arranged adjacent in a desired pattern on the sleeve 200a. In one embodiment, for example, the heat tape may be a polyamide flexible membrane heater film configured to generate heat and provide the generated heat to an exterior surface of a container to which the sleeve 200a is attached. The heating element 222a may be activated/controlled via a control signal from control circuitry and power from a power source. The heating element 222a, for example, may be coupled to a battery (not shown) and various control circuitry (not shown) during formation of the sleeve 200a itself. In some embodiments, the heating element 222a may be arranged adjacent to the reflective surface 220a such that the heating element 222a is interposed between the exterior surface of the beverage container and the reflective surface 220a when the sleeve is engaged with the container. It will be appreciated, however, that the arrangement shown in FIG. 2A is merely one example. In other embodiments, the heating element 222a may be formed from heat foil or other suitable materials, and may have a variety of different arrangements on the sleeve 200a. In general, the heating element 222a may be formed from any desired flexible heating component capable of generating heat while the sleeve 200a is wrapped about an exterior surface of a beverage container. By generating and providing additional heat to the corresponding exterior surface of a beverage container to which the sleeve 200a is engaged, the heating element 222a is expected to significantly extend the time period over which the hot liquid within the beverage container remains at an elevated temperature. More specifically, by generating and providing additional heat to the exterior surface, the amount of heat radiated from the exterior surface of the container may be offset by the heat provided to the exterior surface by the heating element 222a. Because of this, the liquid and the body 104 may reach an equilibrium point where the amount of heat lost by the liquid (e.g., by transferring it into the body of the container or through evaporation of the liquid) is equal to the heat transferred to the liquid from the container body. In this way, the liquid may stay at or near a constant, elevated temperature for an extended period of time, substantially prolonging the time period for which consumption of the beverage is a satisfying experience for the user.

Figure 2B:
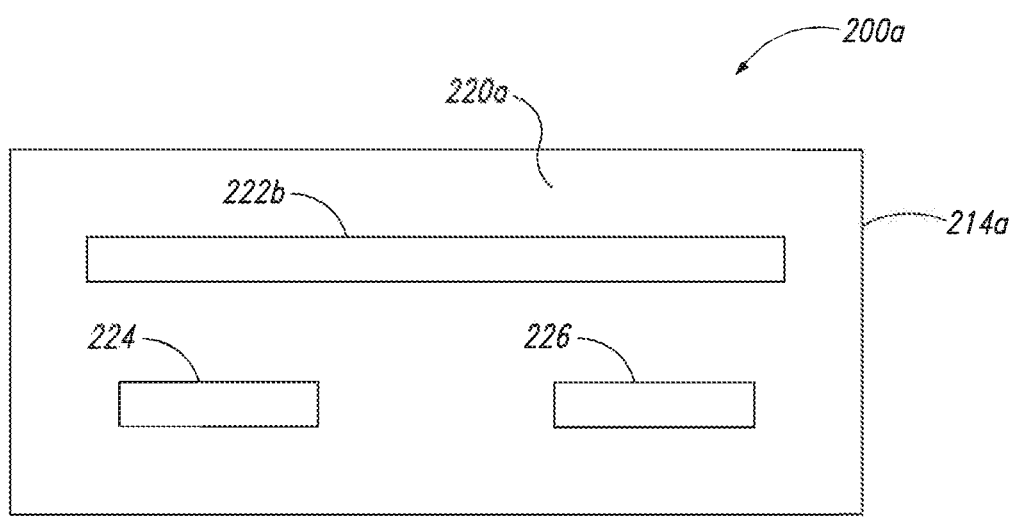
FIG. 2B is a schematic top view of a second embodiment of an inner layer of a sleeve configured in accordance with another embodiment of the present technology.

FIG. 2B is a schematic top view of a second embodiment an inner layer 214b of a sleeve 200b. In addition to the heating element 222b and reflective surface 220b, which are substantially equivalent to the heating element 222a and the reflective surface 220a described above in connection with FIG. 2A, the inner layer 214b also includes a temperature sensor 224 and a pressure sensor 226. These components are both operably coupled to control circuitry located in the outer layer (not shown).

When the sleeve 200b is arranged around the exterior surface of a suitable beverage container (e.g., beverage container 102 of FIG. 1A), the temperature sensor 224 and the pressure sensor 226 are positioned adjacent to the heating element 222b such that the two sensors are interposed between the exterior surface of the beverage container and the reflective surface 220b. The temperature sensor 224 is configured to measure the temperature of the exterior surface of the beverage container and provide the measured temperature to the control circuitry. As will be discussed in greater detail below, the sleeve 200b is adapted to provide the measured temperature to a user of the sleeve 200b so that the user may monitor the temperature the hot beverage.

As will be discussed in greater detail below, the sleeve 200b may also use the temperature sensor 224 to automatically monitor the temperature of the exterior surface of the beverage container and the control circuitry may be programmed to activate the heating element 222b when the measured temperature reaches or approaches a desired temperature. In this way, a beverage that is initially too hot for safe consumption may be allowed to cool to a desired temperature, at which point the heating element 222b may be activated to maintain the temperature of the liquid at that desired temperature for an extended period of time.

Pressure sensor 226 may be configured to measure a pressure that is exerted upon the pressure sensor 226 and to provide the measured pressure to the control circuitry (not shown). For example, the pressure sensor 226 may be configured to record a first or initial pressure when the sleeve 200b is not arranged around the beverage container 102 and a second, higher pressure when the sleeve 200b is engaged with a beverage container. In this way, the pressure sensor 226 may function as an automatic power button such that the control circuitry may be configured to activate the control circuitry and powered components of the sleeve 200b when the pressure sensor 226 determines that the sleeve 200b is engaged with the beverage container, and likewise may turn the powered components of the sleeve 200b off when the pressure sensor 226 determines that the sleeve 200b is no longer engaged with the beverage container.

The use of temperature sensor 224 and pressure sensor 226, however, is optional. In some embodiments, for example, the inner layer 214b may include only the temperature sensor 224, may include only the pressure sensor 226, may include a different sensor, or any combination thereof. In general, inner layer 214b may include any desired combination of sensor(s).

Figure 3:
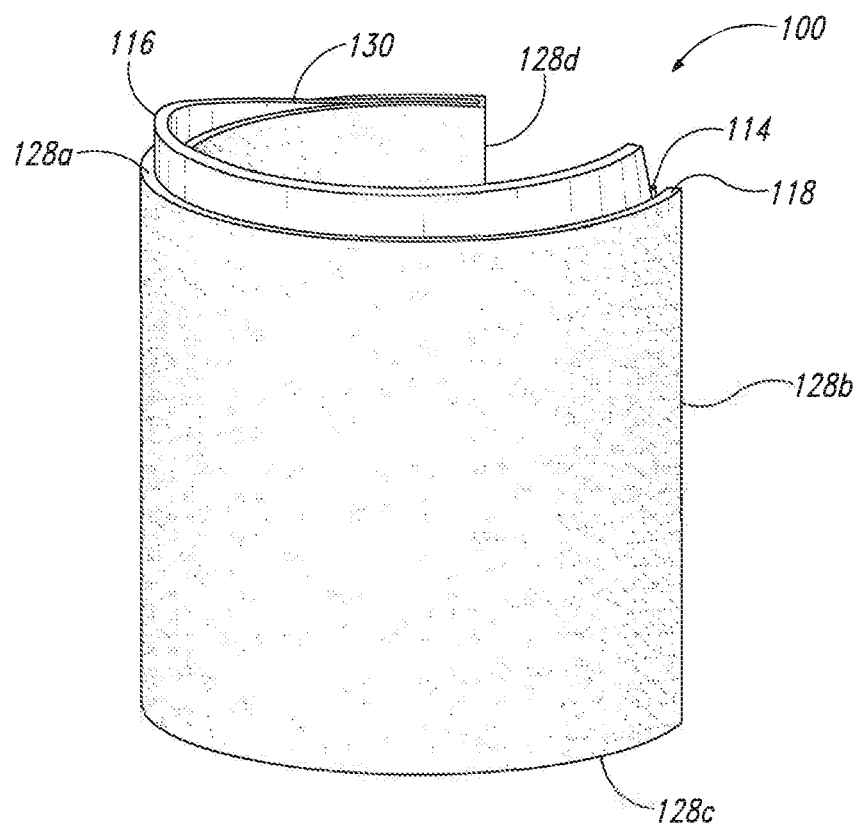
FIG. 3 is a perspective view of the sleeve of FIGS. 1A and 1B with the removable middle layer partially removed in accordance with an embodiment of the present technology.

FIG. 3 is a perspective view of the sleeve 100 of FIGS. 1A and 1B with the removable middle layer 116 partially removed from the sleeve 100. Referring to FIGS. 1A, 1B, and 3 together, as previously mentioned, the inner layer 114 and the outer layer 118 may be releasably coupled to each other along a top edge 128a, such that the two layers form an opening configured to receive the removable middle layer 116. The middle layer 116 may be formed from an insulating material heatable using an external heating element, such as a microwave or hot water bath. When the sleeve 100 is to be used to keep a beverage at an elevated temperature for a long period of time, a user may remove the middle layer 116 from the sleeve 100, heat up the middle layer 116 using an external heating element, reinsert the middle layer 116 into the sleeve 100, and then arrange the sleeve 100 around the exterior surface 106 of a beverage container 102. The warmed insulation material acts as a second heat source by providing additional heat to the exterior surface 106 of the beverage container 102, and reduces the amount of heat transferred from the body 104 of the beverage container 102 to the sleeve 100. The removable insulating material may therefore be used to further prolong the time period for which a hot beverage within a beverage container stays at a desired temperature.

The inner layer 114 and the outer layer 118 may each be formed from rectilinear structures having top, left, bottom, and right edges. During construction of the sleeve 100, the left, bottom, and right edges of the inner layer 114 may each be coupled to the respective left, bottom, and right edges of the outer layer 118 using a fixed or permanent attachment mechanism (e.g., sewing the edges together, applying an adhesive along the edges, etc.). The coupled or fixed edges of the inner layer 114 and the outer layer 118 form the left edge 128b, bottom edge 128c, and right edge 128d of the sleeve 100. The top edge of the inner layer 114 may be coupled to the top edge of the outer layer 118 using a releasable attachment mechanism (e.g., a zipper, snaps, hook and loop apparatus, etc.). The releasably coupled edges of the inner layer 114 and the outer layer 118 form the top edge 128a.

When the top edge 128a of the sleeve 100 is opened (i.e., the releasable attachment mechanism is disengaged and the top edge of the inner layer 114 is separated from the top edge of the outer layer 118), an opening may be formed between the inner layer 114 and the outer layer 118. In this arrangement, the sleeve 100 includes a pouch-like structure and the opening may be configured to receive the removable middle layer 116. In the embodiment shown in FIG. 3, for example, the middle layer 116 is shown partially removed from the opening such that a top edge 130 of the middle layer 116 is positioned over the top edge 128a of the sleeve 100 and is no longer enclosed within the opening between the inner layer 114 and the outer layer 118. If desired, a user of the sleeve may continue to remove the middle layer 116 from the opening until a bottom edge (not shown) of the middle layer 116 is no longer positioned within the opening. At his point, the user may use an external heat source, such as a microwave or a hot water bath, to heat the middle layer 116 to a desired temperature. After being heated, the middle layer 116 may then be reinserted into the opening such that the entirety of the middle layer 116 is enclosed within the opening and the top edge 130 of the middle layer 116 is positioned below the top edge 128a of the sleeve 100. The releasable enclosure mechanism may then be used to secure the top edge of the inner layer 114 to the top edge of the outer layer 118 and the sleeve 100 can then be releasably secured about the exterior surface 106 of the beverage container 102.

The middle layer 116 may be formed, for example, from an insulating material configured to absorb and retain heat given off by the heating elements (not shown) in the inner layer 114, heat given off by the beverage container 102 that does not get reflected back towards the beverage container by the reflective surface (not shown) of the inner layer 114, and/or heat provided to the middle layer 116 by an external heating system. The insulating material may have a thermal resistance (i.e., an R-value) and a thickness designed to allow the sleeve 100 to maintain the temperature of the liquid retained within the beverage container 102 for a period of time without the use of a powered heating element included in the inner layer 114. The insulating material may also be a food safe material to ensure that exposure of the middle layer 116 to external heating mechanisms that may also be used to prepare food (e.g., a microwave) or direct exposure to a user of the sleeve 100 handling the middle layer 116 does not result in the transference of harmful contaminants to the external heating mechanism or the user. In some embodiments, the insulating material may be formed from a natural, vegetable-based, and/or biodegradable material that allows a consumer to purchase a replacement middle layer 116 in the event that the original middle layer 116 is damaged or no longer usable without worrying about the environmental impact of purchasing such a replacement. In other embodiments, however, the insulating material may be composed of different suitable materials. In general, the middle layer 116 may be formed from any desirable material capable of being heated using an external heating system when the middle layer 116 is removed from the sleeve 100.

Figure 4:
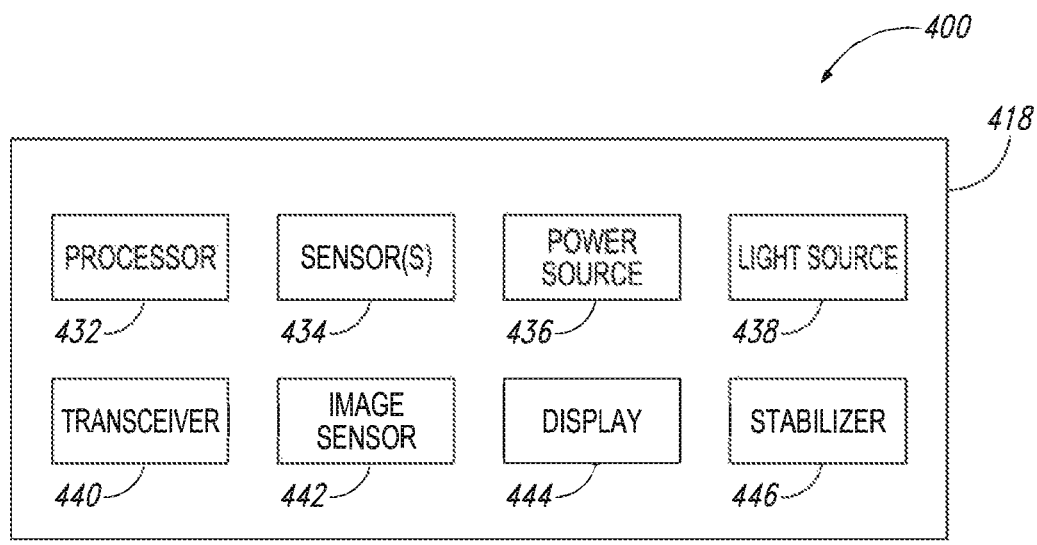
FIG. 4 is a schematic top view of an outer layer of a sleeve configured in accordance with an embodiment of the present technology.

FIG. 4 is a schematic view of an outer layer 418 of a sleeve 400 configured in accordance with an embodiment of the present technology. The sleeve 400 (like sleeves 200a and 200b described above) may include a number of features similar to or identical to the features of sleeve 100 of FIGS. 1A and 1B. Further, the sleeve 100 may include some or all of the features of the sleeve 400 described below. As best seen in FIG. 4, the sleeve 400 comprises a plurality of electrical components. The components may include, for example, a processor 432, at least one sensor 434, a power source 436, a light source 438, a transceiver 440, an image sensor 442, a display 444, and/or a stabilizer 446. The components of the outer layer 418 are configured to enhance functionality of the sleeve 400 when the sleeve 400 is arranged around a suitable beverage container.

The processor 432 (also known as "control circuit") can be electrically coupled to the heating element, temperature sensor, and pressure sensor(s) included in an inner layer (not shown) of the sleeve 400. In some embodiments, for example, the sleeve 400 may include an inner layer and/or a middle layer including some or all of the features of sleeves 200a and 200b described above with reference to FIGS. 2A and 2B. For example, when the sleeve 400 is arranged around a beverage container and is being used to insulate and provide heat to the container, the temperature sensor and pressure sensor provide temperature and pressure measurements to the processor 432. The processor 432 may include a memory circuit configured to store predetermined values (e.g., predetermined temperatures and pressures) and the processor may be configured to compare the measurements from the sensors to the predetermined temperatures and pressures to change the operating mode of the sleeve 400. As previously discussed, the processor 432 may be configured to turn the sleeve 400 on when the pressure measured by the pressure sensor changes from a first pressure (i.e., the beverage container 102 is not pressing against the pressure sensor) to a second, different pressure (i.e., the beverage container 102 is pressing against the sensor), and may be configured to turn the sleeve off when the pressure measured by the pressure sensor changes from the second pressure to the first pressure or a third, different pressure less than the second pressure. In other embodiments, it will also be appreciated that the sleeve 400 may include inner and middle layers (not shown) having different components and/or features.

The processor 432 may also be configured to adjust the amount of heat produced by a heating element, such as heating elements 222a and 222b of FIGS. 2A and 2B, based on the temperature measured by a temperature sensor included in the inner layer. As previously discussed, when a hot liquid is first received within beverage container 102, the temperature of the exterior surface 106 of the beverage container 102 may increase. A temperature sensor coupled to the processor 432 and arranged against the exterior surface 106 can be configured to measure the temperature of the exterior surface 106 and provide the measured temperature to the processor 432. Without using a heating element to provide more heat to the beverage container 102, the temperature of the container and, therefore, the liquid will cool. As it cools, the temperature sensor may continue to measure and report the temperature of the exterior surface 106 to processor 432, which may compare the temperature measurements to a predetermined temperature.

When the measured temperature reaches the predetermined temperature, the processor 432 can be configured to send a control signal to a heating element, turning the heating element on so that it begins to provide head to the beverage container 102. The processor 432 may continue to receive temperature measurements from the temperature sensor while the heating element provides heat to the exterior surface 106. If the temperature measurements continue to decrease past the predetermined temperature, the processor 432 may adjust the control signal sent to the heating element so that the heating element increases the amount of heat provided to the beverage container 102. If the temperature begins to increase to an unsafe temperature or a temperature that may cause an unsatisfactory experience for the consumer, the processor 432 can be configured to change the control signal sent to the heating element such that the heating element decreases the amount of heat provided to the beverage container 102.

The processor 432 may also be coupled to a power source 436 configured to store and provide power to the other electrical components of the sleeve 400. The power source 436, for example, may be a battery configured to be replaced when all of the stored power is used or it may be a rechargeable battery. In embodiments where the power source 436 comprises a rechargeable battery, the sleeve 400 may also include a port configured to receive a power cord or may include a wireless charging apparatus adapted to recharge the battery. However, the use of a power source 436 to power the electrical components of the sleeve 400 is merely an example. In other embodiments, the sleeve 400 may include a port configured to receive a power cord such that the sleeve 400 receives power directly from the power cord. It is appreciated that one of ordinary skill in the art may incorporate a variety of types of power sources to provide power to the electrical components of the sleeve 400.

The outer layer 418 may also include at least one sensor 434 coupled to the processor 432. The processor 432 is configured to change the state of the sleeve 400 based on one or more measurements recorded by the sensor(s) 434. In some embodiments, for example, the sensor 434 may be a fingerprint sensor arranged on an exterior surface of the outer layer 418. The fingerprint sensor may be configured to capture an image of a user's finger when the user positions her/his finger on top of the fingerprint sensor. The image may be provided to the processor 432, which is configured to compare the captured fingerprint image to a predetermined fingerprint image by calculating a difference between the captured fingerprint image and the predetermined fingerprint image. If the calculated difference is less than a predetermined difference threshold, the processor 432 may determine that finger positioned over the fingerprint sensor belongs to the owner of the sleeve 400 and the processor 432 can be configured to transition the sleeve 400 to a desired state. If the calculated difference is greater than the predetermined threshold, the processor 432 may determine that the finger positioned over the sensor belongs to someone other than the owner of the sleeve 400 and the processor 432 can be configured to transition the sleeve to a powerless state.

In other embodiments, the sensor(s) 434 may include other suitable types of sensors in addition to, or in lieu of, the fingerprint sensor. For example, in some embodiments the sensor 434 may include a global positioning sensor (GPS) configured to track the location of the sleeve 400 in the event that the location of the sleeve 400 is unknown to the owner. The sensor 434 may also include one or more accelerometers configured to measure the orientation of the beverage container 102 and may be configured to detect if the beverage container 102 is not oriented properly. In general, the outer layer 418 of the sleeve 400 may include any desired number or types of sensors configured to measure various desired characteristics of the sleeve 400, the beverage container 102, a user of the sleeve 400, and/or the external environment.

In some embodiments, the outer layer 418 may also include a light source 438 positioned on an exterior surface of the outer layer 418 to communicate a current status of the sleeve 400 and/or a beverage within the container 102. In some embodiments, for example, the light source 438 may be configured to turn on when the sleeve 400 is in a powered state and turn off when the sleeve 400 is in a powerless state. The light source 438 may also be configured to have a variable brightness and/or color to convey a status regarding the temperature of the beverage within the beverage container 102 and/or the amount of power remaining within the power source 436. In situations where the sleeve 400 is utilized in a retail environment, the light source 438 may be used, for example, to convey that the container needs a refill. In other embodiments, the light source 438 may be used as a mood indicator or may be used to illuminate a feature on the exterior surface of the sleeve 400, such as a logo. In additional embodiments, the outer layer 418 may include any desired number of light sources 438 and each light source 438 may perform one or more functions.

In some embodiments, the outer sleeve 418 may also include a transceiver 440 operably coupled to the processor 432 and configured to establish a wireless connection between the processor 432 and one or more external control devices (e.g., a cell phone—not shown). The transceiver 440, for example, may be configured to receive a status signal from the processor 432 and transmit the received status signal to the external control device over the established wireless connection. In some embodiments, the status signal may include a temperature measurement collected by the temperature sensor included with the inner layer of the sleeve 400, and/or the status signal may include information from the power source 436 indicating the amount of power remaining within the power source 436. The status signal, for example, may be displayed by an application on the external control device so that the user of the external control device can review the status signal remotely.

In some embodiments, the transceiver 440 may also be configured to receive a control signal from the external control device. A user of an external control device connected to the sleeve 440 over a wireless connection, for example, may use an application on the external control device to set a desired temperature for the liquid within the beverage container 102. The external control device may also generate a control signal that includes the desired temperature and may transmit the control signal over the wireless connection. The transceiver 440 may be further configured to receive the control signal and provide the received signal (or the desired temperature) to the processor 432, which may then adjust the amount of heat provided to the beverage container 102 based on the desired temperature. This, however, is merely an example. In other embodiments, the transceiver 440 may be configured to receive an "On" (or "Off") signal generated by an external control device and the processor 432 may be configured to transition the sleeve 400 to a powered-on state (or powered-off state), respectively, in response to receiving the signal from the external control device. In general, the transceiver 440 may be configured to receive any desired signal from the external control device.

The transceiver 440 may be further configured to establish a wireless connection using any desired wireless communication scheme. In some embodiments, for example, the transceiver 440 may be a Bluetooth transceiver configured to communicate with an external communication device using a Bluetooth connection. In other embodiments, the transceiver 440 may be a Wi-Fi transceiver configured to communicate with the external communication device using a Wi-Fi connection. It will be appreciated that one of ordinary skill in the art may replace the transceiver 440 with any desired type of transceiver such that the transceiver is capable of forming a wireless connection with one or more external control devices using any desired wireless communication scheme.

In some embodiments, the outer layer 418 may also include an image sensor 442 configured to capture images or videos. The image sensor 442 may function as a secondary camera for an external control device wirelessly connected to the image sensor 442 using the transceiver 440 or may be used as a stand-alone image sensor.

A display 444 may be arranged along the exterior surface of the outer layer 418 and adapted to display a status of the sleeve 400, such as the battery life, or a status of the liquid within the beverage container 102, such as the temperature measured by a temperature sensor. In some embodiments, for example, the display 444 may be coupled to the image sensor 442 and configured to display images and/or videos captured by the image sensor. In other embodiments, the display 444 may be used to display a logo. The display 444 may be a flexible display capable of conforming to the curved surface of the outer layer 418 when the sleeve 400 is arranged around a beverage container having a curved exterior surface.

In still other embodiments, the outer layer 418 may also include a stabilizer 446 (e.g., a gyroscope) configured to prevent the beverage container from accidentally tipping over when the sleeve 400 is attached thereto. Additional electrical components, such as a speaker, may also be included in the outer layer 418.

Figure 5A:
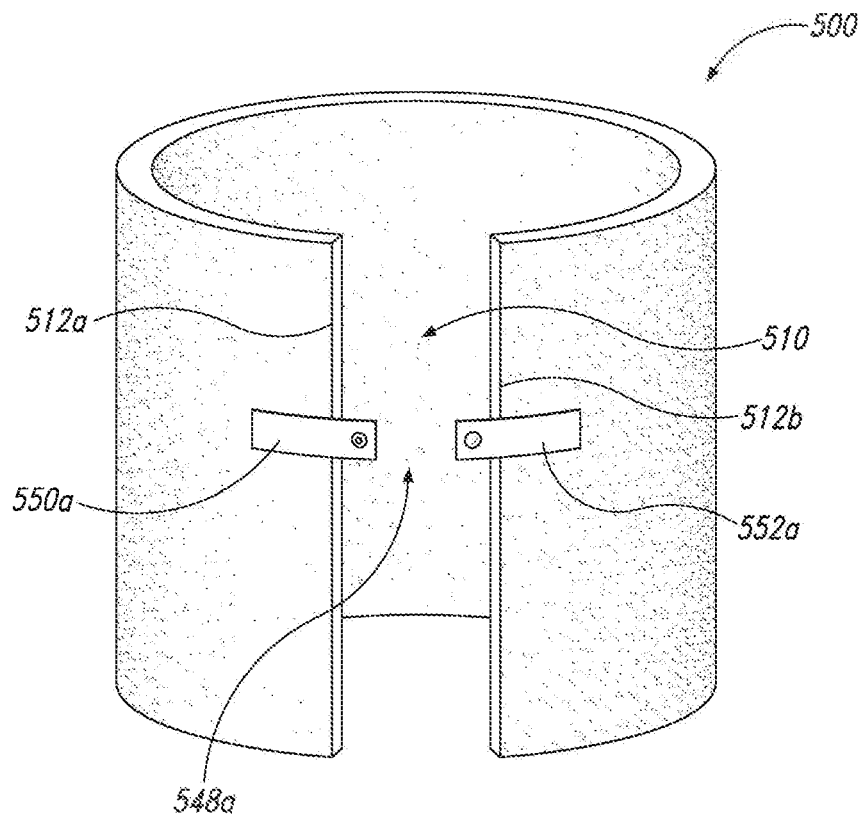
FIG. 5A is a perspective view of a sleeve with a securing mechanism configured in accordance with another embodiment of the present technology.

FIG. 5A is a perspective view of a sleeve 500 having a securing mechanism 548a configured in accordance with an embodiment of the present technology. The securing mechanism 548a, for example, may be used to secure the sleeve 500 when it is arranged around a beverage container (e.g., beverage container 102). As previously discussed in connection with FIG. 1A, a gap 510 may be formed between opposing end portions 512a and 512b of the sleeve 500 when the sleeve 500 is engaged with a beverage container having a circumference larger than the length of the sleeve 500. In the illustrated embodiment, the securing mechanism 548a includes a first part 550a coupled to the first end portion 512a and a second part 552a coupled to the second end portion 512b. The first and second parts 550a, 552a may be formed from a flexible material, such as fabric, configured to span across the gap 510. In some embodiments, for example, the flexible material may have an adjustable length or may be stretchable and a user of the sleeve 500 may be able to adjust the length of the securing mechanism 548a such that the sleeve 500 fits around beverage containers having outer circumferences with different sizes.

The first and second parts 550a, 552a of the securing mechanism 548a may each include half of a connection means that may be configured to connect the two parts to each other. In some embodiments, such as the embodiment shown in FIG. 5a, the connection means is a snap system. In these embodiments, the half of the snap system included with the first part 550a is configured to receive the half of the snap system included with the second part 552a, forming a secure connection between the two halves and securely fastening the first and second parts 550a. 552a of the securing mechanism 548a, and therefore the first and second end portions 512a, 512b, to each other.

Figure 5B:
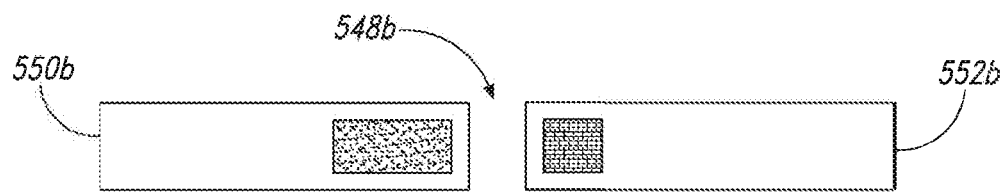
FIG. 5B is an isometric view of a securing mechanism configured in accordance with yet another embodiment of the present technology.

FIG. 5B is an isometric view of an alternative securing mechanism 548b that includes a hook and loop system. In embodiments that include the securing mechanism 548b, a user of the sleeve 500 may position the first part 550b adjacent to the second part 552b and may press the two parts together so a secure connection between the two halves of the attachment means is formed.

Figure 5C:
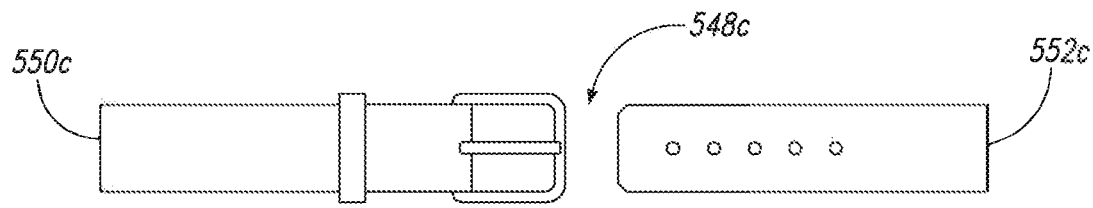
FIG. 5C is an isometric view of a securing mechanism configured in accordance with still another embodiment of the present technology.
Figure 6A:
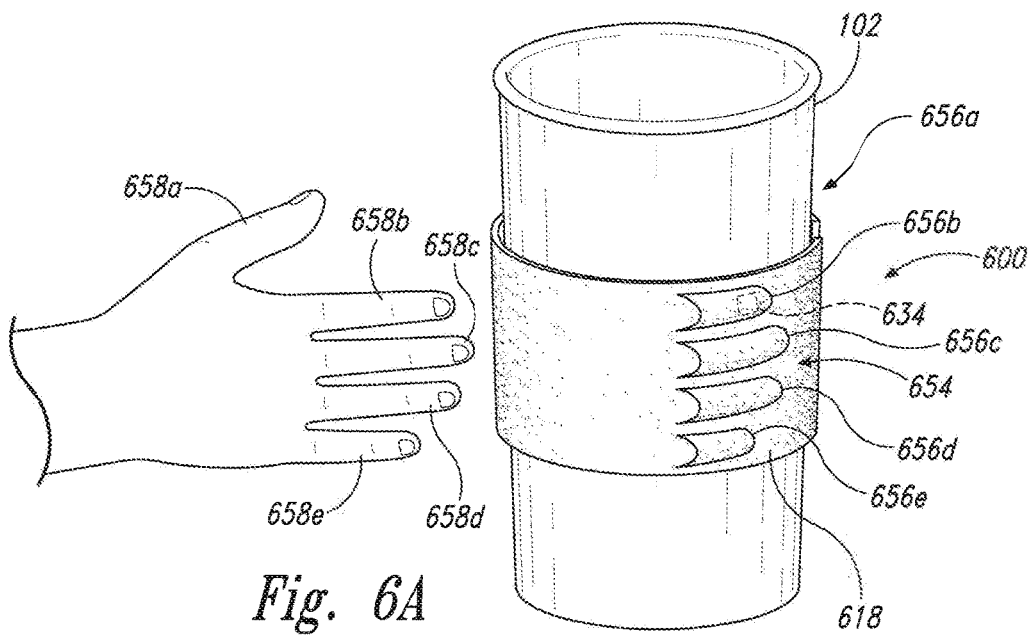
FIG. 6A is a perspective view of a sleeve having a gripping mechanism configured in accordance with an embodiment of the present technology arranged about a beverage container.

FIG. 5C is an isometric view of an alternative securing mechanism 548c that includes a buckle system. In embodiments that include the securing mechanism 548c, a user of the sleeve may position the second part 552c through the first part 550c such that the buckle receives the strap and the prong fits within a hole formed in the strap a secure connection between the two halves of the attachment means is formed FIG. 6A is a perspective view of a sleeve 600 configured in accordance with another embodiment of the present technology arranged around the beverage container 102. The sleeve 600 includes a gripping mechanism 654 positioned to receive at least a portion of a hand of a user of the sleeve 600. The gripping mechanism 654 may include, for example, a plurality of finger sleeves 656 sized and shaped to receive a user's fingers 658 (shown individual as 658a-e) when the flexible sleeve is engaged with the beverage container 102. The finger sleeves 656, for example, comprise projections or protrusions extending outwardly away from the sleeve 600 and include an open end positioned to receive at least a portion of a user's finger and a closed end opposite the open end. In some embodiments, such as the embodiment shown in FIG. 6A, the gripping mechanism 654 may include five separate finger sleeves, with each sleeve positioned to receive a single finger of a user's hand. In these embodiments, for example, the first finger sleeve 656a (not shown) may be positioned to receive the user's thumb 658a, the second finger sleeve 656b may be positioned to receive the user's pointer finger 658b, the third finger sleeve 656c may be positioned to receive the user's middle finger 658c, the fourth finger sleeve 656d may be positioned to receive the user's ring finger 658d, and the fifth finger sleeve 656e may be positioned to receive the user's pinkie finger 658e. The five finger sleeves 656a-e may be arranged on the exterior surface of the outer layer 618 of the sleeve 600 and may be positioned and oriented such that gripping the beverage container 102 when the sleeve 600 is arranged around the container 102 is a comfortable experience for the user.

The use of five finger sleeves 656a-e, however, is merely an example. In other embodiments, the gripping mechanism 654 may include fewer than five finger sleeves. For example, in embodiments that only include four finger sleeves, the gripping mechanism 654 may not include a finger sleeve 656a positioned to receive a user's thumb 658a and may only include the finger sleeves 656b-e each positioned to receive a respective one of the user's fingers 658b-e. In other embodiments, gripping mechanism 654 may include finger sleeves positioned to receive more than one finger. For example, the gripping mechanism 654 may include a first finger sleeve 656a positioned to receive a user's thumb 658a, a second finger sleeve 656b positioned to receive the user's pointer finger 658b and middle finger 658c, and a third finger sleeve 656c positioned to receive the user's ring finger 658d and pinkie finger 658e. In general, the gripping mechanism 654 may include any desired number of finger sleeves 656 that may be positioned around the exterior surface of the sleeve 600 in any desired position so that the sleeves 656 may each receive any desired number of fingers 658.

Each finger sleeve 656 may be formed from a flexible material. In some embodiments, for example, the material may be an insulating material configured to keep the fingers 658 at a comfortable temperature, regardless of the temperature of the air surrounding the sleeve 600. In other embodiments, however, the finger sleeves 656 may be composed of different materials and/or have a different arrangement.

As previously discussed in connection with the embodiment shown in FIG. 4, the outer layer 618 of the sleeve 600 may include a fingerprint sensor 634. In embodiments that include the gripping mechanism 654, for example, the fingerprint sensor 634 may be arranged within finger sleeve 656 such that the finger 658 of the user may be positioned over the fingerprint sensor 634 when the corresponding finger 658 is received within the sleeve 656. In these embodiments, the fingerprint sensor 634 may be configured to capture the fingerprint image of the user's finger 658 when the finger sleeve 656 receives the finger 658 and may be configured to provide the fingerprint image to the processor 632 (not shown) as discussed above in connection with FIG. 4. The fingerprint sensor 634 may be positioned within any of the finger sleeves 656a-e and may be configured to capture a fingerprint image of any respective finger 658a-e.

Figure 6B:
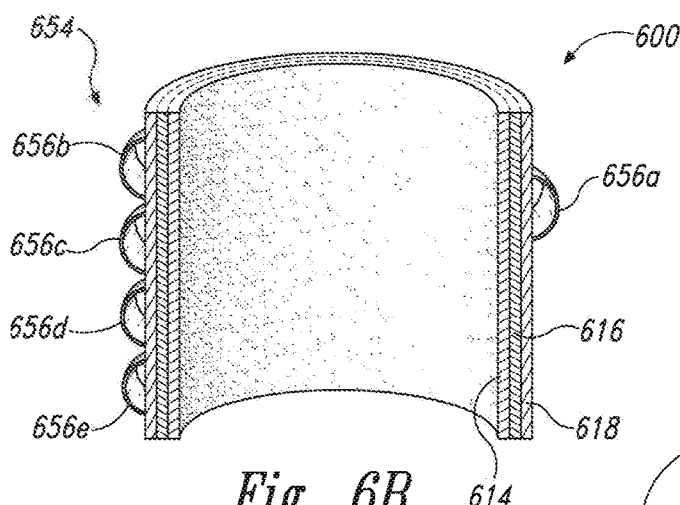
FIG. 6B is a cross-sectional view of the sleeve configured in accordance with the embodiment of the present technology.

FIG. 6B is a cross-sectional view of an embodiment of a portion of the sleeve 600 arranged about the beverage container 102. As previously described, the sleeve 600 may include an inner layer 614, middle layer 616, and outer layer 618. Finger sleeves 656a-e may be arranged on an exterior surface of the outer layer 618. As shown in FIG. 6B, for example, the first finger sleeve 656a, which may be positioned to receive a user's thumb 658a, is positioned on a first side of the sleeve 600 while finger sleeves 656b-e, which may be positioned to receive a user's fingers 658b-e, are positioned on a second side opposite the first side. Separating the first finger sleeve 656a from the other finger sleeves 656b-e is expected to allow a user's fingers 658a-e to comfortably fit into the finger sleeves 656a-e such that utilizing the gripping mechanism 654 of the sleeve 600 is a convenient and effective way for the user to hold the beverage container 102.

Figure 6C:
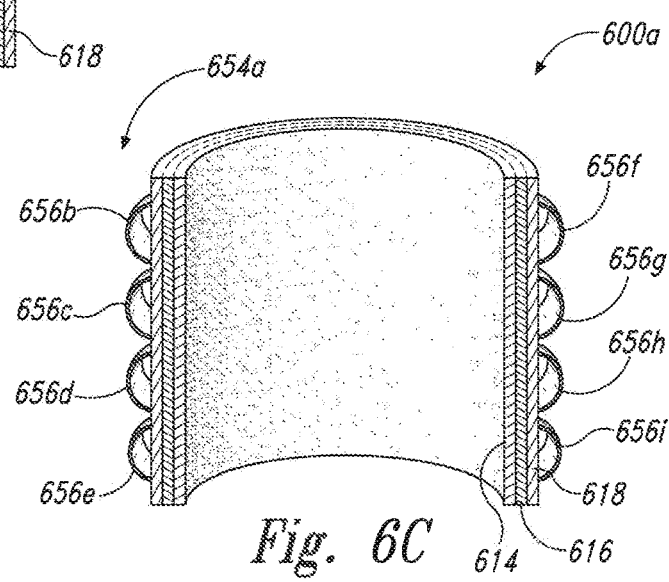
FIG. 6C is a cross-sectional view of the sleeve configured in accordance with an alternative embodiment of the present technology.

FIG. 6C is a cross-sectional view of an alternative embodiment of a sleeve 600a arranged about the beverage container 102. The sleeve 600a can include a number of features similar to the features of the sleeve 600 described above. In this embodiment, however, the sleeve 600a includes a gripping mechanism 654a having additional finger sleeves 656 positioned for engagement with a user's fingers (not shown). For example, the sleeve 600a a first plurality of finger sleeves 656b-e that are positioned to receive fingers 658 (FIG. 6A) of the user's first hand (e.g., the user's right hand), while the sleeve 600a further includes a second plurality of finger sleeves 656f-i that are positioned to receive fingers 658 of the user's second hand (e.g., the user's left hand). In the arrangement shown in FIG. 6C, the first and second sets of finger sleeves 656 are positioned on opposing sides of the sleeve 600a. The sleeve 600a is configured such that the first plurality of finger sleeves 656b-e may receive fingers 658 from the user's first hand at the same time that the second plurality of finger sleeves 656f-i receive fingers 658 on the user's second hand so that the user may use both hands to hold the beverage container 102 (FIG. 6A).

Figure 7:
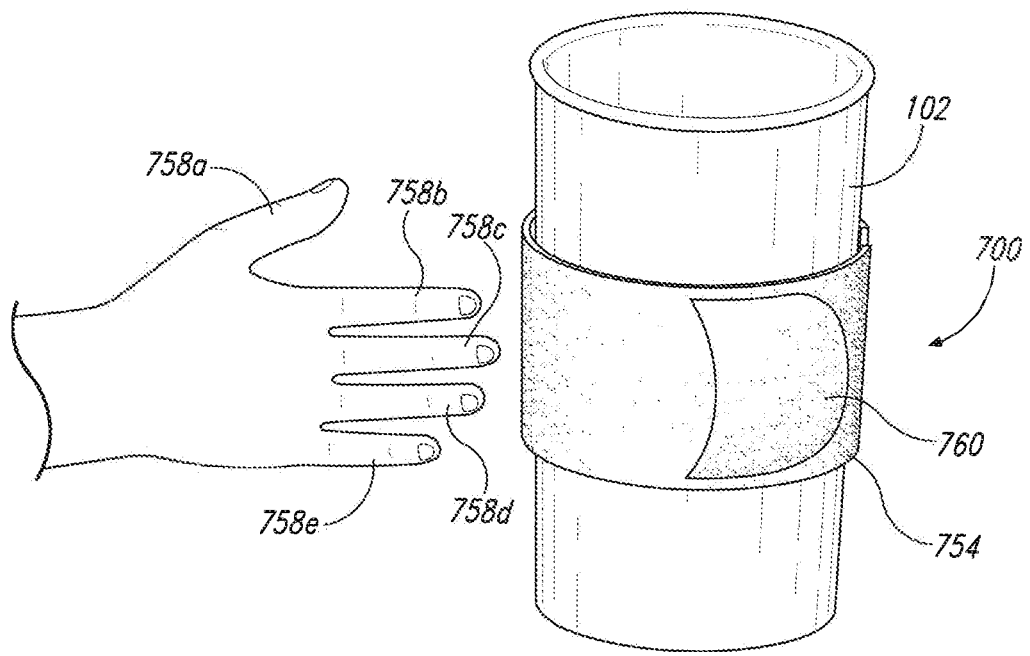
FIG. 7 is a perspective view of a sleeve having a gripping mechanism configured in accordance with another embodiment of the present technology arranged about a beverage container.

FIG. 7 is a perspective view of a sleeve 700 arranged around a beverage container 102 in accordance with still another embodiment of the present technology. The sleeve 700 includes a gripping mechanism 754 positioned to receive at least a portion of a hand 756 belonging to a user of the sleeve 700. The gripping mechanism 754 may include a hand sleeve 760 positioned to receive multiple of the user's fingers 758a-e when the user is holding onto the sleeve 600 and the beverage container 102. In some embodiments, such as the embodiment shown in FIG. 7, the gripping mechanism 754, the hand sleeve 760 may be positioned to receive a user's pointer finger 758a, middle finger 758b, ring finger 758c, and pinkie finger 758e but may not be positioned to receive the user's thumb 758a. However, this is merely an example. In other embodiments, the hand sleeve 760 may be positioned to receive any number of fingers 758. The hand sleeve 760 may be formed from a flexible material. In some embodiments, the material may be an insulating material configured to keep the fingers 758 at a comfortable temperature regardless of the temperature of the air surrounding the sleeve 700. In embodiments that include a fingerprint sensor, such as the fingerprint sensor 434 described above in connection with FIG. 4, the sensor may be positioned within the hand sleeve 760.

Figure 8:
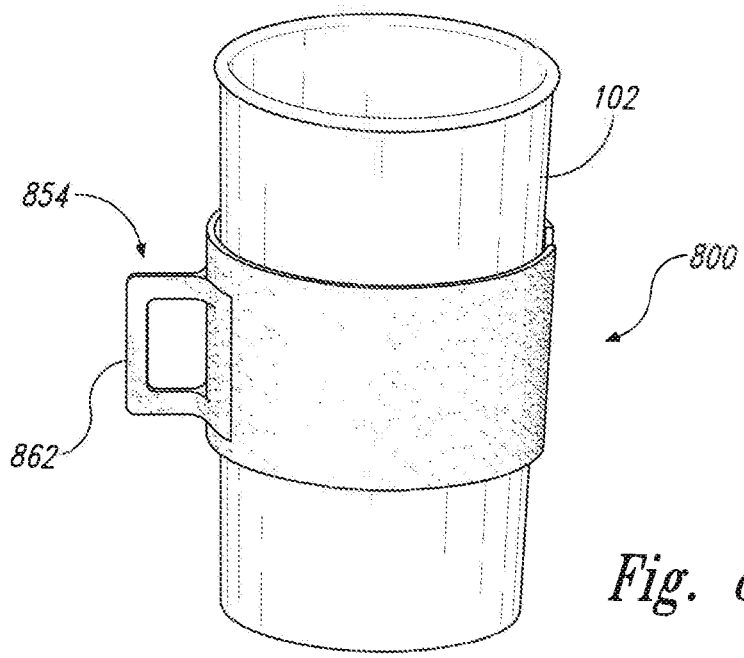
FIG. 8 is a perspective view of a sleeve having a gripping mechanism configured in accordance with yet another embodiment of the present technology arranged about a beverage container.

FIG. 8 is a perspective view of a sleeve 800 configured in accordance with yet another embodiment of the present technology engaged with the beverage container 102. The sleeve 800 includes a gripping mechanism 854 configured to be grasped by a hand (not shown) of a user of the sleeve 800. The gripping mechanism 854 may include a handle 862 coupled to the exterior face of the sleeve 800 and formed from a rigid material configured to be grabbed by the user's hand. In embodiments that include a fingerprint sensor, such as the fingerprint sensor 434 described above in connection with FIG. 4, the fingerprint sensor may be positioned on a surface of the handle 862.

Figure 9:
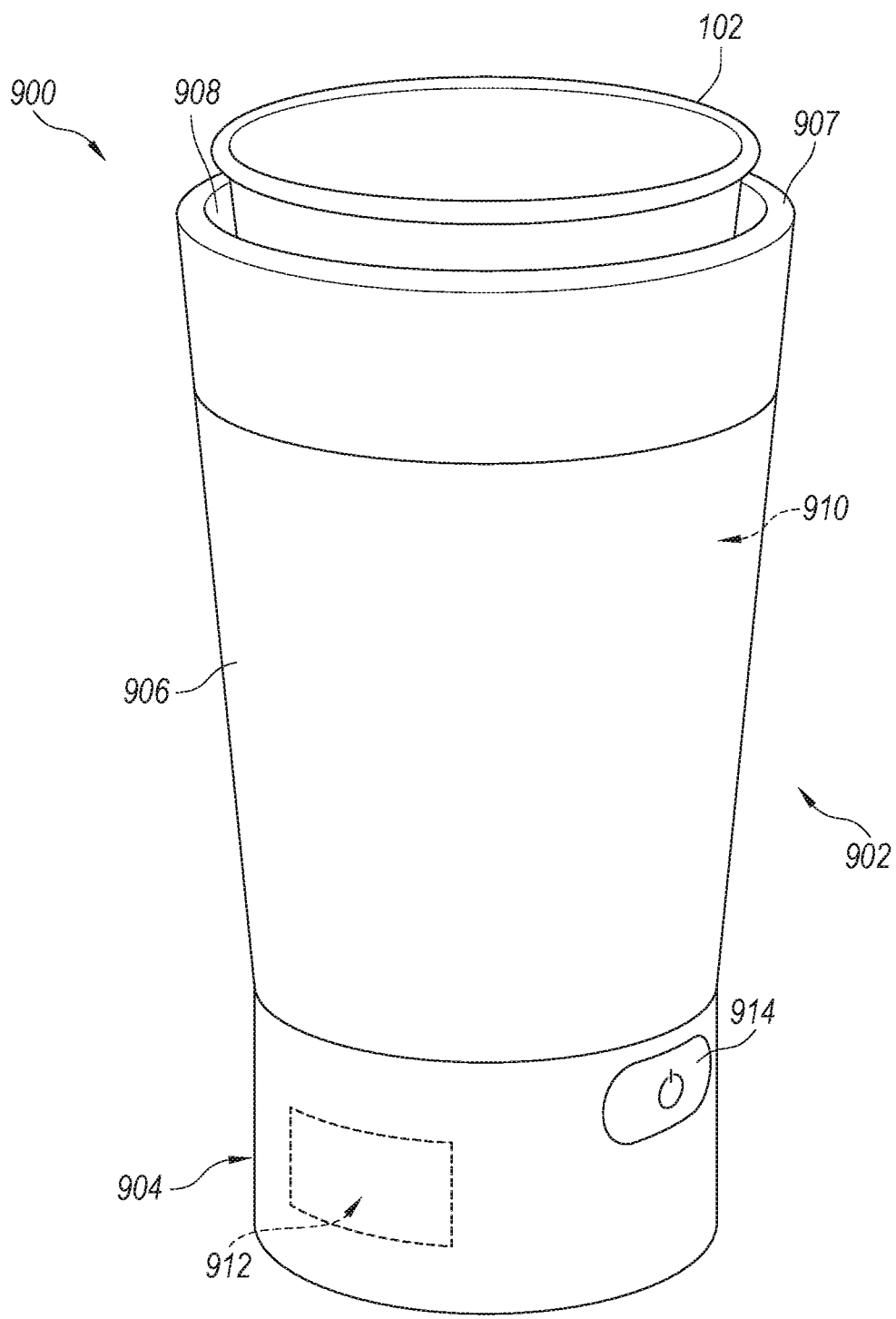
FIG. 9 is a perspective view of a beverage container received within a heating apparatus configured in accordance with embodiments of the present technology.

In the previously illustrated embodiments, the beverage container 102 is heated using a flexible sleeve that wraps around the exterior surface of the beverage container 102. In other embodiments, however, the beverage container 102 can be heated using a heating apparatus having a different configuration. FIG. 9, for example, is an isometric view of the beverage container 102 received within a heating apparatus 900 configured in accordance with further embodiments of the present technology. The heating apparatus 900 includes an upper portion 902 configured to receive the beverage container 102 and a base portion 904 coupled to the upper portion 902. In the illustrated embodiment, the upper portion 902 has a generally frusto-conical shape. In other embodiments, however, the upper portion 902 can be cylindrical or can be any other suitable shape that allows the beverage container 102 to be securely received therein. In some embodiments, the upper portion 902 and the base portion 904 are formed as a single component. In other embodiments, however, the upper portion 902 and base portion 904 are different components operably coupled together.

The upper portion 902 and base portion 904 can be formed from metal, plastic, or any other suitable material. Further, in some embodiments the upper portion 902 and the base portion 904 can be formed from the same material, while in other embodiments the upper portion 902 and base portion 904 may be composed of different materials. In some embodiments, for example, the upper portion 902 can be formed from a material having insulative properties while the base portion 904 may be formed from a material without insulative properties. In other embodiments, both the upper portion 902 and base portion 904 can be formed from insulating materials.

The upper portion 902 includes an exterior surface 906 and an interior surface 908. The interior surface 908 at least partially defines a cavity 910 sized and shaped to securely receive the beverage container 102 therein. The exterior surface 906 can be formed from metal, plastic, or any other suitable material. The exterior surface 906 can further include a gripping mechanism. In some embodiments, for example, at least a portion of the exterior surface 906 can be rough so that a user can securely grasp the exterior surface. In other embodiments, the exterior surface 906 can include other suitable gripping mechanisms, such as gripping mechanism 654 (FIGS. 6A-6C), gripping mechanism 754 (FIG. 7) or gripping mechanism 854 (FIG. 8). The gripping mechanism is an optional component that may not be included in some embodiments.

As will be discussed in greater detail below, the heating apparatus 900 includes heating elements disposed within the cavity 900 that are configured to generate heat that can be used to heat up the liquid within the beverage container 102. However, if care is not taken, hot air within the cavity 910 can escape from the cavity 910 by passing between the inner surface 908 and the outer surface of the beverage container 102, thus removing heat from the heating apparatus 900. Accordingly, in some embodiments, the upper portion 902 can include a lip portion 907 that is shaped such that, when the beverage container 102 is received within the cavity 910, the lip portion 907 is directly adjacent to the beverage container 102. In this way, the lip portion 907 can at least partially limit the amount of heat that is lost from the beverage container due to heated air escaping from the cavity 910. In some embodiments, the lip portion 907 can be removable from the upper portion 902 so that the inner cavity 910 can be more easily accessible. In other embodiments, however, the lip portion 907 can be integrally formed as part of the upper portion 902.

The base portion 904 is securely coupled to the upper portion 902 and includes a plurality of electrical components 912 (shown schematically in FIG. 9). In some embodiments, for example, the electrical components 912 can include the components described in connection with FIG. 4, such as processor 432, one or more sensors 434, power source 436, light source 438, transceiver 440, image sensor 442, display 444, and/or stabilizer 446. The base portion 904 can also include a power button 914, which can be used to turn the heating apparatus 900 on and off. The base portion 904 may also include a port (not shown) for receiving a cable (not shown) that can be used to charge the power source 436 (FIG. 4) and/or interface with the electrical components 912.

Figure 10:
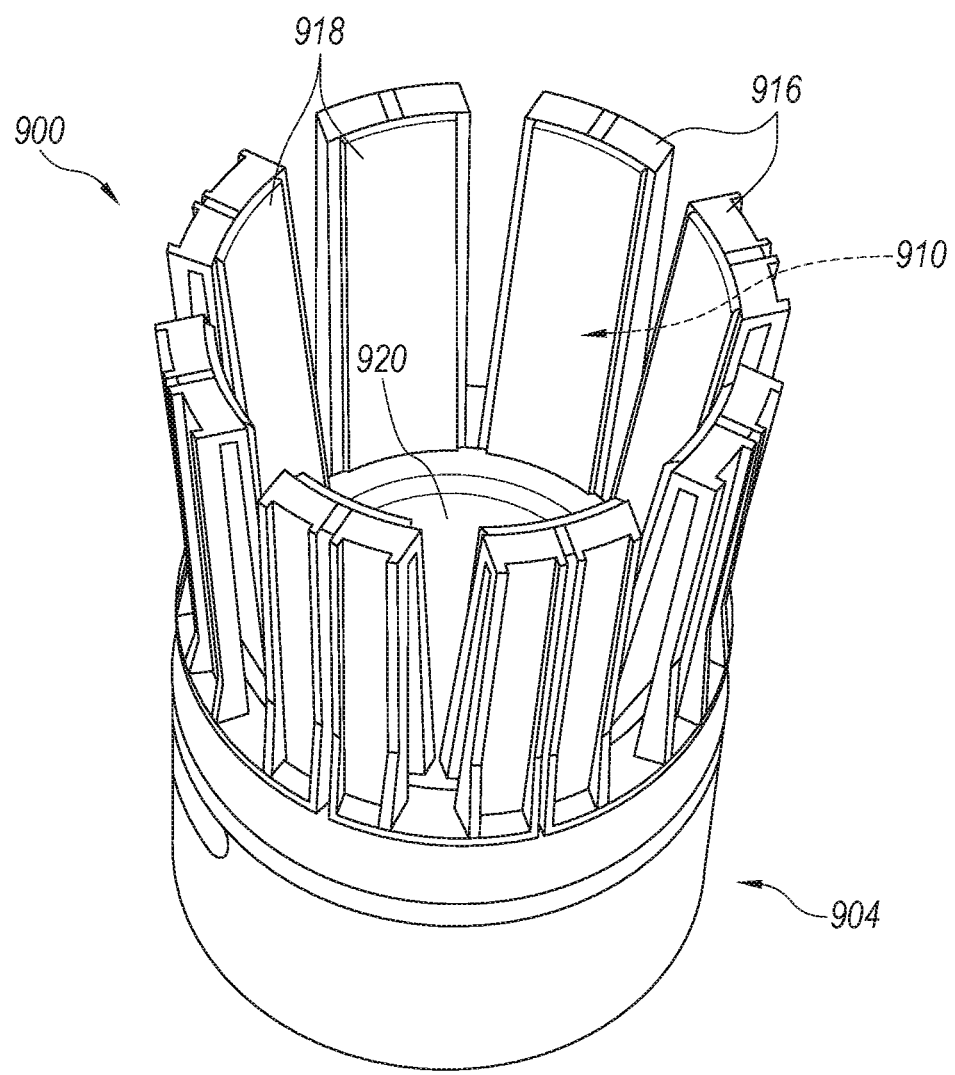
FIG. 10 is an isometric view of the heating apparatus shown in FIG. 9 having an upper portion removed to show pressure arms and heating elements configured in accordance with embodiments of the present technology.

When the beverage container 102 is positioned within the cavity 910, heating elements disposed within the cavity 910 can be used to heat the beverage container 102 so that liquid within the beverage container 102 is kept at an elevated temperature for a prolonged period of time. FIG. 10 is an isometric view of the apparatus 900 having the upper portion 902 removed for purposes of illustration to show a plurality of heating elements 918 carried by pressure arms 916. In some embodiments, the heating elements 918 can include the heat tape previously described in connection with FIG. 2A. In other embodiments, the heating elements 918 can include a different type of heating component, such as silicone heaters. The heating elements 918 are coupled to inner surfaces of the pressure arms 916 and are positioned in a generally circular arrangement such that the heating elements 918 at least partially define the cavity 910 and are positioned to face the exterior surface of the beverage container (not shown) when the beverage container is positioned within the cavity 910. The heating elements 918 can be coupled to the electrical components 912 (FIG. 9) such that the electrical components 912 can act as control circuitry for the heating elements 918.

Figure 11B:
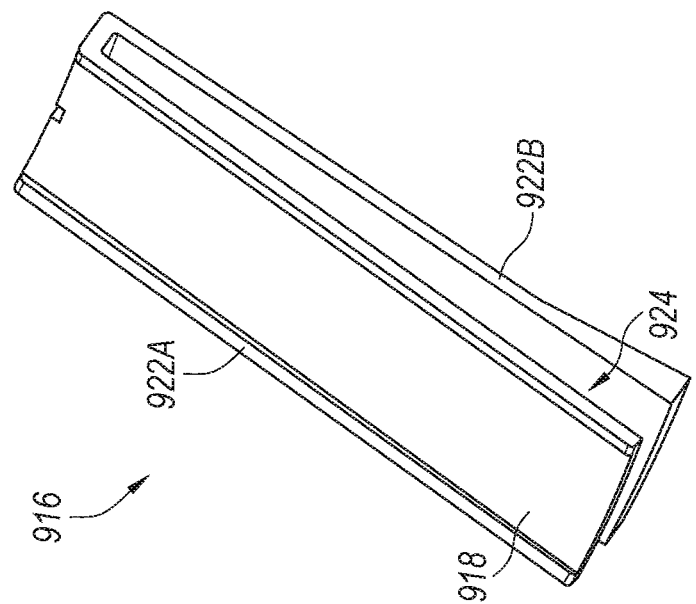
FIG. 11B is an isometric view a pressure arm before installation with the holder.
Figure 11A:
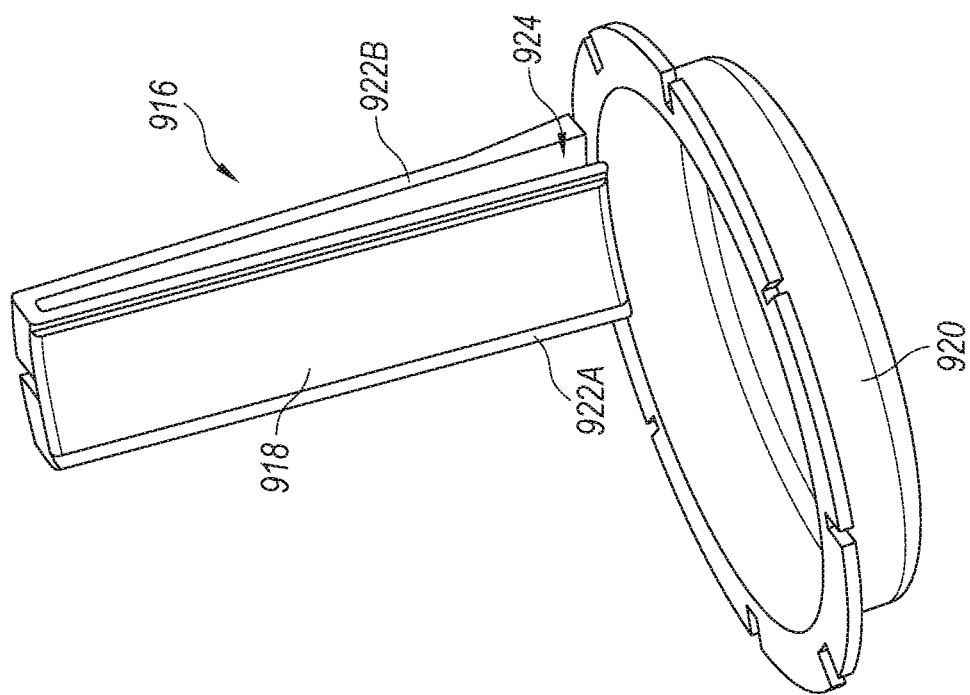
FIG. 11A is an isometric view of one of the pressure arms shown in FIG. 10 coupled to a circular holder.

The pressure arms 916 are operably coupled to a circular holder 920 positioned immediately adjacent to the base portion 904. FIG. 11A, for example, shows an isometric view of one of the pressure arms 916 coupled to the circular holder 920 and FIG. 11B show an isometric view of one of the pressure arms 916 (removed from the circular holder 920 for purposes of illustration). Referring to FIGS. 10-11B together, each of the pressure arms 916 has a generally U-shaped configuration and includes first and second leg portions 922A and 922B coupled together such that a gap 924 is formed therebetween. Each of the first leg portions 922A include the heating elements 918 formed on an inner facing surface of the first leg portions 922A and each of the second leg portions 922B is coupled to an outer perimeter of the circular holder 920 such that the pressure arms 916 are arranged about the holder 920 in a circular arrangement with the individual heating elements 918 facing the cavity 910 (FIG. 10). In some embodiments, when a beverage container is positioned within the cavity 910, the beverage container can rest on an upper surface of the circular holder 920. In other embodiments, the pressure arms 916 are configured to suspend the beverage container 102 (FIG. 9) above and out of contact with the circular holder 920.

The pressure arms 916 can be formed from a single, unitary component such that first and second leg portions 922A and 922B are integrally coupled together at an upper portion of the pressure arms 916. With this arrangement, when the beverage container 102 is inserted into the cavity 910, the beverage container 102 can push the first leg portions 922A toward the second leg portions 922B and decrease the size of the gap 924. However, the pressure arms 916 can be formed from a generally stiff material such that the pressure arms 916 are biased to return to their original shape after the beverage container 102 is removed from the cavity 910. Further, when the beverage container 102 is positioned within the cavity 102, the stiffness of the pressure arms 916 can cause the first leg portions 922A to each apply a force on the beverage container 102. In this way, the heating apparatuses 918 can be pressed into the exterior surface of the beverage container 102 so that contact, and accordingly the amount of heat transferred from the heating apparatuses 918 to the beverage container 102, can be maximized. Further, pressure exerted by the first leg portions 922A onto the beverage container 102 can help to keep the beverage container 102 remain securely positioned within the cavity 910 so that the beverage container does not inadvertently become dislodged from the heating apparatus 900 during use.

The ability of the pressure arms 916 to elastically deform when a beverage container 102 is inserted into the heating apparatus 900 allows the heating apparatus 900 to accommodate differently-sized beverage containers 102. For example, paper cups typically used for hot cups of coffee are often sold in small, medium, and large size variants that are each sized to hold a different amount of a beverage (e.g., 8 ounces, 12 ounces, 16 ounces). However, such differently-sized beverage containers 102 can have different heights and widths and the angles of the sidewalls that form the exterior surface of the beverage containers 102 can have different orientations. When these differently-sized beverage containers 102 are inserted into cavity 910, the heating apparatus 900 is configured such that the beverage container 102 received therein pushes the first leg portions 922A toward the second leg portions 922B and the beverage container 102 is securely received within the cavity 910. Because of this arrangement, the apparatus 900 is expected to be usable with and securely receive beverage containers having a variety of different shapes and sizes.

B. Additional Examples

Several aspects of the present technology are set forth in the following examples.

1. A flexible band configured to wrap around an exterior surface of a beverage container, the flexible band comprising:

a first layer configured to be positioned in contact with the exterior surface of the beverage container, wherein the first layer comprises a reflective surface facing the beverage container and a heating element configured to provide heat to the exterior surface of the beverage container;

a second layer adjacent to and covering at least a portion of the first layer, wherein the second layer comprises a removable insulation assembly; and a third layer adjacent to and covering at least a portion of the second layer, wherein the third layer comprises a battery and control circuitry electrically coupled to the heating element.

2. The flexible band of example 1 wherein the first layer comprises:

a temperature sensor operatively connected to the control circuitry, wherein the temperature sensor is configured to measure a temperature of the exterior surface of the beverage container and provide the measured temperature to the control circuitry.

3. The flexible band of example 2 wherein:

the control circuitry is configured to compare the measured temperature to a predetermined threshold temperature, and the control circuitry is further configured to output a control signal to activate the heating element when the control circuitry determines that the measured temperatures is less than the predetermined threshold temperature.

4. The flexible band of example 1, further comprising:

an opening formed between the first layer and the third layer, wherein the opening is configured to receive the removable insulation assembly.

5. The flexible band of example 4 wherein:

the first layer comprises a first bottom edge and a first top edge, the third layer comprises a second bottom edge and a second top edge, the first bottom edge is fixedly coupled to the second bottom edge, and the first top edge is releasably coupled to the second top edge.

6. The flexible band of example 5, wherein:

the flexible band is transformable between a first configuration and a second, different configuration, in the first configuration, the first top edge is sealably coupled to the second top edge, and in the second configuration, the first top edge is disengaged with the second top edge.

7. The flexible band of example 6 wherein, when the flexible band is in the second configuration, the opening is configured to receive the removable insulation assembly.

8. The flexible band of example 1 wherein the heating element comprises heat tape, and wherein the heat tape is configured to provide heat to the exterior surface of the beverage container when the heat tape receives a control signal from the control circuitry.

9. The flexible band of example 1, further comprising:

a securing mechanism, wherein the securing mechanism is configured to secure a first end of the flexible band to a second end of the flexible band when the flexible band is wrapped around the exterior surface of the beverage container.

10. A flexible sleeve configured to receive a beverage container, the flexible sleeve comprising:

an inner layer configured to be positioned in contact with an exterior surface of the beverage container, wherein the inner layer comprises a reflective surface facing the beverage container and a heating element configured to provide heat to the exterior surface;

a middle layer adjacent to and covering at least a portion of the inner layer, wherein the middle layer comprises an insulation assembly; and an outer layer adjacent to and covering at least a portion of the middle layer, wherein the outer layer comprises a battery and control circuitry electrically coupled to the heating element.

11. The flexible sleeve of example 10 wherein the inner layer comprises:

a temperature sensor operatively connected to the control circuitry, wherein the temperature sensor is configured to measure a temperature and to provide the measured temperature to the control circuitry.

12. The flexible sleeve of example 11 wherein the outer layer comprises:

wireless communication circuitry coupled to the control circuitry, wherein the wireless communication circuitry is configured to communicate with an external control device using a wireless connection.

13. The flexible sleeve of example 12 wherein the control circuitry is configured to provide the measured temperature to the external control device over the wireless connection using the wireless communication circuitry.

14. The flexible sleeve of example 12 wherein:

the heating element is configured to provide a first amount of heat to the exterior surface of the beverage container.

the wireless communication circuitry is configured to receive a first control signal from the external control device over the wireless communication circuitry and provide the first control signal to the control circuitry, the control circuitry is configured to send a second control signal to the heating element based on the first control signal, and the heating element is configured to provide a second amount of heat to the exterior surface of the beverage container when the heating element receives the second control signal.

15. The flexible sleeve of example 11, further comprising:

a pressure sensor arranged on the inner layer and operatively connected to the control circuitry, wherein the pressure sensor is configured to determine if the beverage container is present in the flexible sleeve;

an accelerometer operatively connected to the control circuitry and configured to measure an orientation of a beverage container received by the flexible sleeve; and a display arranged on the outer layer, wherein the display is configured to display at least the measured temperature.

16. The flexible sleeve of example 10 wherein the insulation assembly comprises a removable insulation assembly removable from the flexible sleeve.

17. A flexible band configured to wrap around an exterior surface of a beverage container, the flexible band comprising:

a reflective surface facing the beverage container;
a heating element configured to provide heat to the exterior surface of the beverage container;
a removable insulation assembly;
a battery operably coupled to the heating element;
control circuitry coupled to the heating element; and
a temperature sensor coupled to the control circuitry and configured to measure a temperature of the exterior surface of the beverage container.

18. The flexible band of example 17 wherein:

the heating element is configured to provide a first amount of heat to the exterior surface of the beverage container;
the temperature sensor is configured to provide the measured temperature to the control circuitry;
the control circuitry is configured to compare the measured temperature to a predetermined temperature; and
the heating element is further configured to provide a second amount of heat different than the first amount of heat to the exterior surface of the beverage container in response to a signal from the control circuitry that the measured temperature is less than the predetermined temperature.

19. The flexible band of example 17 wherein the heating element comprises heat tape, and wherein the heat tape is configured to be positioned in contact with the exterior surface of the beverage container.

20. The flexible band of example 17 wherein:

the control circuitry is configured to receive the measured temperature from the temperature sensor and compare the measured temperature to a predetermined temperature; and
the control circuitry is further configured to activate the heating element to adjust the temperature of the exterior surface of the beverage container if the measured temperature is less than the predetermined temperature.

21. A flexible band configured to wrap around an exterior surface of a beverage container, the flexible band comprising:

a first layer configured to be positioned in contact with the exterior surface of the beverage container, wherein the first layer comprises a reflective surface facing the beverage container and a heating element configured to provide heat to the exterior surface of the beverage container;

a second layer adjacent to and covering at least a portion of the first layer, wherein the second layer comprises a removable insulation assembly; and a third layer adjacent to and covering at least a portion of the second layer, wherein the third layer comprises a gripping mechanism including one or more finger sleeves positioned to receive finger(s) of a user when the flexible band is wrapped around the beverage container.

22. The flexible band of example 21 wherein the one or more finger sleeves comprises a plurality of finger sleeves protruding away from the third layer, and wherein the individual finger sleeves are positioned to receive individual fingers of a user when the user engages the flexible band.

23. The flexible band of example 22 wherein the plurality of finger sleeves comprises a first group of finger sleeves and a second group of finger sleeves, and wherein the flexible band further comprises:

a first end portion; and
a second end portion opposite the first end portion,
wherein the first end portion comprises the first group of finger sleeves and the second end portion comprises the second group of finger sleeves.

24. The flexible band of example 23 wherein the first group of finger sleeves comprises a thumb sleeve positioned to receive the user's thumb when the user engages the flexible band.

25. The flexible band of example 23 wherein the second group of finger sleeves comprises at least one finger sleeve and wherein the at least one finger sleeve is positioned to receive at least one of the user's fingers when the user engages the flexible band.

26. The flexible band of example 25 wherein the at least one finger sleeve comprises a first finger sleeve and a second finger sleeve, wherein the first finger sleeve is positioned to receive the user's pointer finger and the second finger sleeve is positioned to receive the user's pinkie finger when the user engages the flexible band.

27. The flexible band of example 26 wherein the at least one finger sleeve further comprises:
   a third finger sleeve; and
   a fourth finger sleeve,
   wherein the third finger sleeve is positioned to receive the user's middle finger and the fourth finger sleeve is positioned to receive the user's ring finger when the user engages the flexible band.

28. The flexible band of example 22 wherein the plurality of finger sleeves comprises:
   a first finger sleeve positioned to receive the user's thumb;
   a second finger sleeve positioned to receive the user's pointer finger;
   a third finger sleeve positioned to receive the user's middle finger;
   a fourth finger sleeve positioned to receive the user's ring finger; and
   a fifth finger sleeve positioned to receive the user's pinkie finger.

29. The flexible band of example 22 wherein:
   the third layer comprises control circuitry electrically coupled to the heating element;
   the gripping mechanism comprises a fingerprint reader electrically coupled to the control circuitry;
   the fingerprint reader is positioned in one of the plurality of finger sleeves; and
   the control circuitry is configured to receive a fingerprint image from the fingerprint reader and, if the received fingerprint image matches a predetermined fingerprint image, transition the heating element between a powerless state and a powered state.

30. The flexible band of example 22 wherein the one or more finger sleeves each comprise insulating material.

31. A flexible sleeve configured to be removably attached to an exterior surface of a beverage container, the flexible sleeve comprising:
   an inner layer configured to be positioned in contact with an exterior surface of the beverage container, wherein the inner layer comprises a reflective surface facing the beverage container; and
   an outer layer adjacent to and covering at least a portion of the inner layer, wherein the outer layer comprises—
      a battery;
      control circuitry electrically coupled to the heating element; and
      a gripping mechanism,
      wherein the gripping mechanism includes a plurality of projections extending away from the outer layer, the individual projections being sized and shaped to receive at least a portion of a user's hand when the flexible sleeve is engaged with the beverage container.

32. The flexible sleeve of example 31 wherein the gripping mechanism further comprises a fingerprint reader electrically connected to the control circuitry.

33. The flexible sleeve of example 31 wherein the plurality of projections comprises a first plurality of projections and wherein:
   the gripping mechanism includes a second plurality of projections extending away from the outer layer, each of the second plurality of projections being sized and shaped to receive at least a portion of a second hand of the user when the flexible sleeve is engaged with the beverage container.

34. The flexible sleeve of example 31 further comprising a middle layer positioned between the inner layer and the outer layer, wherein the middle layer comprises a removable insulation assembly.

35. The flexible sleeve of example 31 wherein each of the individual projections are formed from an insulating material.

36. The flexible sleeve of example 31, wherein the plurality of projections comprises:
   a first projection at a first end portion of the flexible sleeve; and
   a second projection formed at a second end portion of the sleeve opposite the first end portion, and further wherein—
      the first projection is sized and shaped to receive the user's thumb, and
      the second projection is sized and shaped to receive the user's pointer finger.

37. A flexible band configured to wrap around an exterior surface of a beverage container, the flexible band comprising:
   a heating element configured to provide heat to the exterior surface of the beverage container;
   control circuitry coupled to the heating element; and
   a gripping mechanism coupled to an outer surface of the flexible band, wherein—
      the gripping mechanism comprises at least one projections extending away from the outer layer, and
      the at least one projection is sized and shaped to receive at least a portion of a finger belonging to a user when the flexible band is engaged with the exterior of the beverage container.

38. The flexible band of example 37, further comprising:
   a first layer that includes the heating element;
   a second layer adjacent to the first layer; and
   a third layer adjacent to the second layer, wherein the second layer is interposed between the first and third layers, and
   wherein the third layer includes the control circuitry and the gripping mechanism.

39. The flexible band of example 37 wherein the at least one projection comprises a pocket positioned to receive at least two fingers of the user when the flexible band is engaged with the exterior of the beverage container.

40. The flexible band of example 37 wherein the at least one projection is formed from an insulating material.

41. A heating apparatus having a cavity configured to receive a beverage container, the heating apparatus comprising:
   a generally rigid upper portion at least partially defining the cavity;
   a base portion operably coupled to the upper portion;
   a plurality of heating elements disposed within the upper portion to at least partially define the cavity,
   wherein each of the plurality of heating elements is positioned such that, when the beverage container is received within the heating apparatus, the heating elements are adjacent to and engage an exterior surface of the beverage container.

42. The heating apparatus of example 41, further comprising a plurality of pressure arms disposed within the upper portion, wherein each of the pressure arms comprises:
   a first leg portion; and
   a second leg portion coupled to and integral with the first leg portion,
   wherein individual heating elements are carried by the inner surfaces of corresponding first leg portions.

43. The heating apparatus of example 41 or example 42 wherein the plurality of pressure arms are disposed in a generally circular arrangement about the cavity within the upper portion of the heating apparatus.

44. The heating apparatus of example 42 or example 43 wherein:
   when the beverage container is not received within the cavity, the first and second leg portions are spaced apart from each other by a first gap, and
   when the beverage container is received within the cavity, the first and second leg portions are spaced apart from each other by a second gap smaller than the first gap.

45. The heating apparatus of example 44 wherein:
   the beverage container comprises a first beverage container having a first size,
   the cavity is configured to receive a second beverage container having a second size larger than the first size, and
   when the second beverage container is received within the cavity, the first and second leg portions of each of the plurality of pressure arms are spaced apart from each other by a third gap that is smaller than the second gap.

46. The heating apparatus of example 45 wherein:
   the cavity is configured to receive a third beverage container having a third size larger than the second size, and
   when the third beverage container is received within the cavity, the first and second leg portions of each of the plurality of pressure arms are spaced apart from each other by a fourth gap that is smaller than the third gap.

47. The heating apparatus of any one of examples 41-46, further comprising:
   a circular holder positioned between the upper portion and the base portion, wherein the second leg portions of each of the plurality of pressure arms are removably coupled to and extend away from the circular holder.

48. The heating apparatus of any one of examples 41-47 wherein the base portion includes control circuitry coupled to the plurality of heating elements.

49. The heating apparatus of any one of examples 41-48 wherein the heating elements are configured to selectively heat the beverage container so that a liquid within the beverage container remains at or near a desired temperature.

CONCLUSION

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments may perform steps in a different order. Moreover, the various embodiments described herein may also be combined to provide further embodiments (e.g., the individual sleeves and heating apparatuses disclosed herein may include components from one or more of the other disclosed sleeves/heating apparatuses and/or the sleeves/heating apparatuses may include additional/different components or features).

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Where the context permits, singular or plural terms may also include the plural or singular term, respectively. Additionally, the term "comprising" is used throughout to mean including at least the recited feature(s) such that any greater number of the same feature and/or additional types of other features are not precluded.

It will also be appreciated that specific embodiments have been described herein for purposes of illustration, but that various modifications may be made without deviating from the technology. Further, while advantages associated with certain embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A heating apparatus having a cavity configured to receive a beverage container, the heating apparatus comprising:
   a generally rigid upper portion at least partially defining the cavity;
   a base portion operably coupled to the upper portion;
   a plurality of heating elements disposed within the upper portion to at least partially define the cavity,
   a plurality of pressure arms disposed within the upper portion, wherein each of the pressure arms comprises—
      a first leg portion; and
      a second leg portion integral with the first leg portion,
      wherein each pressure arm comprises a generally U-shaped configuration and the first leg portion and the second leg portion are coupled together such that a gap is defined therebetween;
      wherein individual heating elements of the plurality of heating elements are carried by inner surfaces of corresponding first leg portions of each pressure arm,
   wherein each of the plurality of heating elements is positioned such that, when the beverage container is received within the heating apparatus, the heating elements are adjacent to and engage an exterior surface of the beverage container.

2. The heating apparatus of claim 1 wherein the plurality of pressure arms are disposed in a generally circular arrangement about the cavity within the upper portion of the heating apparatus.

3. The heating apparatus of claim 1 wherein:
   when the beverage container is not received within the cavity, the first and second leg portions are spaced apart from each other by a first gap, and
   when the beverage container is received within the cavity, the first and second leg portions are spaced apart from each other by a second gap smaller than the first gap.

4. The heating apparatus of claim 3 wherein:
the beverage container comprises a first beverage container having a first size,
the cavity is configured to receive a second beverage container having a second size larger than the first size, and
when the second beverage container is received within the cavity, the first and second leg portions of each of the plurality of pressure arms are spaced apart from each other by a third gap that is smaller than the second gap.

5. The heating apparatus of claim 4 wherein:
the cavity is configured to receive a third beverage container having a third size larger than the second size, and
when the third beverage container is received within the cavity, the first and second leg portions of each of the plurality of pressure arms are spaced apart from each other by a fourth gap that is smaller than the third gap.

6. The heating apparatus of claim 1, further comprising:
a circular holder positioned between the upper portion and the base portion, wherein the second leg portions of each of the plurality of pressure arms are removably coupled to and extend away from the circular holder.

7. The heating apparatus of claim 1 wherein the base portion includes control circuitry coupled to the plurality of heating elements.

8. The heating apparatus of claim 1 wherein the heating elements are configured to selectively heat the beverage container so that a liquid within the beverage container remains at or near a desired temperature.

9. A heating apparatus, comprising:
a base;
a plurality of pressure elements extending from the base, wherein the pressure elements define, at least in part, a cavity capable of receiving a container therein; and
a plurality of heating elements,
wherein individual heating elements of the plurality of heating elements are at inner surfaces of corresponding pressure elements and positioned such that, when the container is received in the cavity, the heating elements are adjacent to and engage an exterior surface of the container.

10. The heating apparatus of claim 9 wherein each pressure element comprises an engaging portion, and wherein the engaging portion is movable between (a) a first position when the container is not received in the cavity and (b) a second position different than the first position when the container is received in the cavity.

11. The heating apparatus of claim 10 wherein a periphery of the cavity is larger when the engaging portions are in the second position than when the engaging portions are in the first position.

12. The heating apparatus of claim 10 wherein at least one of the engaging portions is arranged at a different height than at least one other of the engaging portions.

13. The heating apparatus of claim 9 wherein the plurality of pressure elements are positioned to exert pressure onto an external surface of the container when the container is received in the cavity such that that container is removably secured within the cavity during operation.

14. The heating apparatus of claim 9 wherein the plurality of heating elements are configured to selectively heat the container so that an interior of the container remains at or near a desired temperature while the container is received in the cavity.

15. The heating apparatus of claim 9 wherein each pressure element comprises a generally U-shaped configuration and includes a first leg portion and a second leg portion coupled together such that a gap is defined therebetween, and wherein the heating elements are carried by corresponding first leg portions of the pressure elements.

16. The heating apparatus of claim 15 wherein each pressure element comprises a single, unitary component such that the first and second leg portions are integrally coupled together.

17. The heating apparatus of claim 9 wherein the heating elements comprise silicone heaters.

18. The heating apparatus of claim 9 wherein the heating elements comprise heat tape.

19. The heating apparatus of claim 9 wherein the base comprises control circuitry operably coupled to the plurality of heating elements.

20. The heating apparatus of claim 9 wherein the container is a beverage container.

* * * * *

UNITED STATES PATENT AND TRADEMARK OFFICE
CERTIFICATE OF CORRECTION

| | |
|---|---|
| PATENT NO. | : 11,839,328 B2 |
| APPLICATION NO. | : 16/954001 |
| DATED | : December 12, 2023 |
| INVENTOR(S) | : Jeffrey M. Walsh |

It is certified that error appears in the above-identified patent and that said Letters Patent is hereby corrected as shown below:

In the Specification

In Column 12, Line 54, delete "550a." and insert -- 550a, --.

In Column 13, Line 4, delete "formed" and insert -- formed. --.

In Column 16, Line 60, delete "1I A," and insert -- 11A, --.

In Column 19, Line 30, delete "container." and insert -- container, --.

In the Claims

In Column 26, Line 16, in Claim 13, delete "that that" and insert -- that --.

Signed and Sealed this
Second Day of April, 2024

*Katherine Kelly Vidal*

Katherine Kelly Vidal
*Director of the United States Patent and Trademark Office*